(12) United States Patent
Song

(10) Patent No.: US 12,158,564 B2
(45) Date of Patent: Dec. 3, 2024

(54) CAMERA OPTICAL LENS

(71) Applicant: AAC Optics (Suzhou) Co., Ltd., Suzhou (CN)

(72) Inventor: Jian Song, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 476 days.

(21) Appl. No.: 17/544,803

(22) Filed: Dec. 7, 2021

(65) Prior Publication Data

US 2023/0119578 A1    Apr. 20, 2023

(30) Foreign Application Priority Data

Sep. 24, 2021   (CN) .......................... 202111123661.X

(51) Int. Cl.
*G02B 9/60* (2006.01)
*G02B 13/00* (2006.01)
*G02B 27/00* (2006.01)

(52) U.S. Cl.
CPC ........... *G02B 13/0045* (2013.01); *G02B 9/60* (2013.01); *G02B 27/0025* (2013.01)

(58) Field of Classification Search
CPC .. G02B 13/0045; G02B 9/60; G02B 27/0025; G02B 13/04; G02B 13/06; G03B 30/00
See application file for complete search history.

(56) References Cited

U.S. PATENT DOCUMENTS

| 2012/0147482 | A1* | 6/2012 | Tsai | G02B 13/18 359/714 |
| 2019/0129137 | A1* | 5/2019 | Nitta | H04N 23/55 |
| 2019/0265438 | A1* | 8/2019 | Sekine | G02B 7/021 |
| 2020/0301104 | A1* | 9/2020 | Nitta | G02B 13/0045 |

* cited by examiner

*Primary Examiner* — William R Alexander
*Assistant Examiner* — MacKenzi Waddell
(74) *Attorney, Agent, or Firm* — W&G Law Group

(57) ABSTRACT

The present invention discloses a camera optical lens including, from an object side to an image side in sequence, a first lens having a positive refractive power, a second lens having refractive power, a third lens having a negative refractive power, a fourth lens having a positive refractive power, and a fifth lens having a negative refractive power. The camera optical lens satisfies the following conditions: $1.20 \leq f1/f \leq 3.00$, $-8.00 \leq f5/f \leq -2.00$, $3.00 \leq d5/d6 \leq 10.00$, and $-1.00 \leq (R3+R4)/(R3-R4) \leq 0$. The camera optical lens according to the present invention has excellent optical characteristics, such as large aperture, wide angle, and ultra-thin.

9 Claims, 15 Drawing Sheets

CAMERA OPTICAL LENS

FIELD OF THE PRESENT INVENTION

The present invention relates to the field of optical lens, and more particularly, to a camera optical lens suitable for handheld terminal devices, such as smart phones and digital cameras, and imaging devices, such as monitors or PC lenses.

DESCRIPTION OF RELATED ART

In recent years, with the rise of various smart devices, the demand for miniaturized camera optics has been increasing, and the pixel size of photosensitive devices has shrunk, coupled with the development trend of electronic products with good functions, thin and portable appearance. Therefore, miniaturized imaging optical lenses with good image quality have become the mainstream in the current market. In order to obtain better imaging quality, a multi-piece lens structure is often used. Moreover, with the development of technology and the increase of diversified needs of users, as the pixel area of the photosensitive device continues to shrink and the system's requirements for image quality continue to increase, the five-element lenses structure gradually appears in the lens design. There is an urgent need for a wide-angle imaging lens with excellent optical characteristics, small size, and fully corrected aberrations.

SUMMARY

In the present invention, a camera optical lens has excellent optical characteristics with large aperture, ultra-thin and wide angle.

According to one aspect of the present invention, a camera optical lens comprises, from an object side to an image side in sequence, a first lens having a positive refractive power, a second lens having refractive power, a third lens having a negative refractive power, a fourth lens having a positive refractive power, and a fifth lens having a negative refractive power. The camera optical lens satisfies the following conditions: $1.20 \leq f1/f \leq 3.00, -8.00 \leq f5/f \leq -2.00, 3.00 \leq d5/d6 \leq 10.00$, and $-1.00 \leq (R3+R4)/(R3-R4) \leq 0$. f denotes a focal length of the camera optical lens, f1 denotes a focal length of the first lens, R3 denotes a central curvature radius of an object side surface of the second lens, R4 denotes a central curvature radius of an image side surface of the second lens, d5 denotes an on-axis thickness of the third lens, d6 denotes an on-axis distance from an image side surface of the third lens to an object side surface of the fourth lens, and f5 denotes a focal length of the fifth lens.

As an improvement, the camera optical lens further satisfies the following condition: $2.00 \leq R7/R8 \leq 15.00$. R7 denotes a central curvature radius of the object side surface of the fourth lens, and R8 denotes a central curvature radius of an image side surface of the fourth lens.

As an improvement, the first lens has an object side surface being convex in a paraxial region and an image side surface being convex in the paraxial region. The camera optical lens further satisfies the following conditions: $-1.96 \leq (R1+R2)/(R1-R2) \leq -0.06$ and $0.04 \leq d1/TTL \leq 0.22$. R1 denotes a central curvature radius of the object side surface of the first lens, R2 denotes a central curvature radius of the image side surface of the first lens, d1 denotes an on-axis thickness of the first lens, and TTL denotes a total optical length from the object side surface of the first lens of the camera optical lens to an image surface of the camera optical lens along an optical axis.

As an improvement, the camera optical lens further satisfies the following conditions: $f2/f \leq 135.44$ and $0.05 \leq d3/TTL \leq 0.24$. f2 denotes a focal length of the second lens, d3 denotes an on-axis thickness of the second lens, and TTL denotes a total optical length from an object side surface of the first lens of the camera optical lens to an image surface of the camera optical lens along an optical axis.

As an improvement, the third lens has an object side surface being concave in a paraxial region and the image side surface of the third lens is convex in the paraxial region. The camera optical lens further conditions: $-3.43 \leq f3/f \leq -0.95$, satisfies the following $-5.46 \leq (R5+R6)/(R5-R6) \leq -1.09$, and $0.03 \leq d5/TTL \leq 0.12$. f3 denotes a focal length of the third lens, R5 denotes a central curvature radius of the object side surface of the third lens, R6 denotes a central curvature radius of the image side surface of the third lens, and TTL denotes a total optical length from an object side surface of the first lens of the camera optical lens to an image surface of the camera optical lens along an optical axis.

As an improvement, the object side surface of the fourth lens is concave in a paraxial region and the fourth lens has an image side surface being convex in the paraxial region. The camera optical lens further satisfies the following conditions: $0.43 \leq f4/f \leq 1.84$, $0.57 \leq (R7+R8)/(R7-R8) \leq 4.44$, and $0.06 \leq d7/TTL \leq 0.27$. f4 denotes a focal length of the fourth lens, d7 denotes an on-axis thickness of the fourth lens, R7 denotes a central curvature radius of the object side surface of the fourth lens, and R8 denotes a central curvature radius of the image side surface of the fourth lens, and TTL denotes a total optical length from an object side surface of a first lens of the camera optical lens to an image surface of the camera optical lens along an optical axis.

As an improvement, the fifth lens has an object side surface being convex in a paraxial region and an image side surface being concave in the paraxial region. The camera optical lens further satisfies the following conditions: $2.14 \leq (R9+R10)/(R9-R10) \leq 9.13$ and $0.04 \leq d9/TTL \leq 0.25$. R9 denotes a central curvature radius of the object side surface of the fifth lens, R10 denotes a central curvature radius of the image side surface of the fifth lens, d9 denotes an on-axis thickness of the fifth lens, and TTL denotes a total optical length from an object side surface of a first lens of the camera optical lens to an image surface of the camera optical lens along an optical axis.

As an improvement, the camera optical lens further satisfies the following condition: $0.63 \leq f12/f \leq 2.61$. f12 denotes a combined focal length of the first lens and the second lens.

As an improvement, the camera optical lens further satisfies the following condition: $FOV \geq 102.7°$. FOV denotes a field of view of the camera optical lens in a diagonal direction.

As an improvement, the camera optical lens further satisfies the following condition: $TTL/IH \leq 1.47$. IH denotes an image height of the camera optical lens, and TTL denotes a total optical length from an object side surface of the first lens of the camera optical lens to an image surface of the camera optical lens along an optical axis.

BRIEF DESCRIPTION OF THE DRAWINGS

In order to explain the technical solutions in the embodiments of the present invention more clearly, the following will briefly introduce the drawings that need to be used in the description of the embodiments. Obviously, the drawings in the following description are only some embodiments of the present invention. For those of ordinary skill in the art, without creative work, other drawings can be obtained based on these drawings, among which.

DETAILED DESCRIPTION OF THE EXEMPLARY EMBODIMENTS

In order to make the objects, technical solutions, and advantages of the present invention more apparent, the embodiments of the present invention will be described in detail below. However, it will be apparent to the one skilled in the art that, in the various embodiments of the present invention, a number of technical details are presented in order to provide the reader with a better understanding of the invention. However, the technical solutions claimed in the present invention can be implemented without these technical details and various changes and modifications based on the following embodiments.

Embodiment 1

Figure 1:
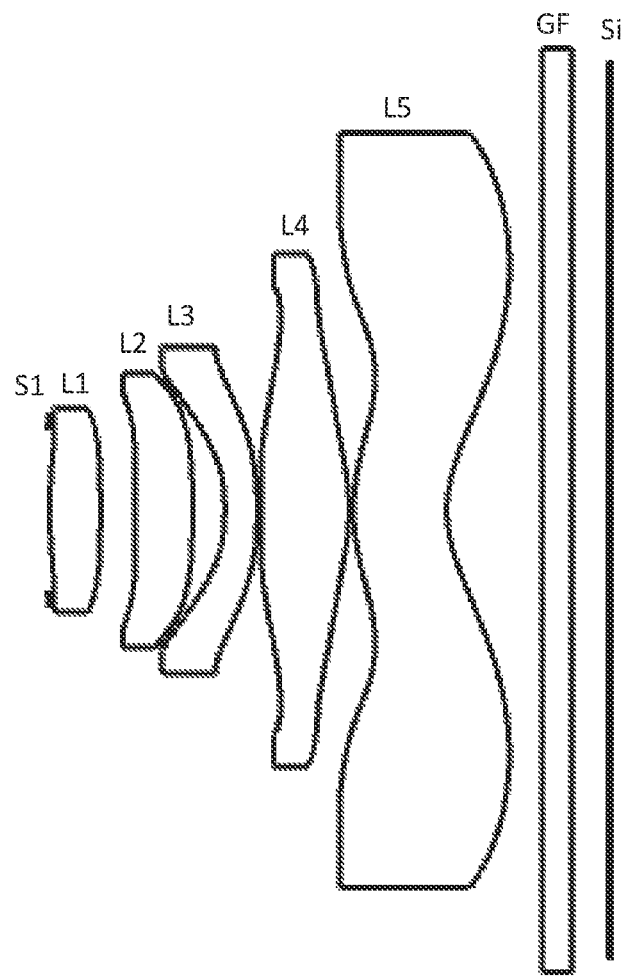
FIG. 1 is a schematic diagram of a structure of a camera optical lens in accordance with Embodiment 1 of the present invention.

As referring to the accompanying drawings, the present invention provides a camera optical lens 10. FIG. 1 shows the camera optical lens 10 according to embodiment 1 of the present invention. The camera optical lens 10 comprises five lenses. Specifically, from an object side to an image side, the camera optical lens 10 comprises in sequence: an aperture S1, a first lens L1, a second lens L2, a third lens L3, a fourth lens L4 and a fifth lens L5. Optical elements like optical filter GF can be arranged between the fifth lens L5 and an image surface S1.

The first lens L1 has a positive refractive power. The second lens L2 has a positive refractive power. The third lens L3 has a negative refractive power. The fourth lens L4 has a positive refractive power. The fifth lens L5 has a negative refractive power. In other optional embodiments, a refractive power of each lens may also be made of other options.

The first lens L1 is made of plastic material, the second lens L2 is made of plastic material, the third lens L3 is made of plastic material, the fourth lens L4 is made of plastic material and the fifth lens L5 is made of plastic material. In other optional embodiments, each lens may also be made of other materials.

A focal length of the camera optical lens 10 is defined as f. A focal length of the first lens L1 is defined as f1. The camera optical lens 10 further satisfies the following condition: $1.20 \leq f1/f \leq 3.00$, which specifies a ratio of the focal length f1 of the first lens L1 to the focal length f of the camera optical lens 10. When the value is within this range, an amount of the field curvature of the camera optical lens 10 can be effectively balanced so that an offset amount of the field curvature of a center field lower than 0.03 mm.

The focal length of the camera optical lens 10 is defined as f, A focal length of the fifth lens L5 is defined as f5. The camera optical lens 10 further satisfies the following condition: $-8.00 \leq f5/f \leq -2.00$, which specifies a ratio of the focal length f5 of the fifth lens L5 to the focal length f of the camera optical lens 10. When the value is within this range, by a reasonable distribution of the refractive power, which makes it is possible that the camera optical lens 10 has an excellent imaging quality and a lower sensitivity.

An on-axis thickness of the third lens L3 is defined as d5. An on-axis distance from the image side surface of the third lens L3 to the object side surface of the fourth lens L4 is defined as d6. The camera optical lens 10 further satisfies the following condition: $3.00 \leq d5/d6 \leq 10.00$, which specifies a ratio of the on-axis thickness d5 of the third lens L3 to the on-axis distance from the image side surface of the third lens L3 to the object side surface of the fourth lens L4. When the value is within this range, it benefits for reducing a total optical length, thereby realizing an ultra-thin effect.

A central curvature radius of an object side surface of the second lens L2 is defined as R3, and a central curvature radius of an image side surface of the second lens L2 is defined as R4. The camera optical lens 10 further satisfies the following condition: $-1.00 \leq (R3+R4)/(R3-R4) \leq 0$, which specifies a shape of the second lens L2. When the value is within this range, which can reduce a deflection of light and effectively correct a chromatism, so that the chromatism $|LC| \leq 3.0$ μm.

A central curvature radius of an object side surface of the fourth lens L4 is defined as R7, and a central curvature radius of an image side surface of the fourth lens L4 is defined as R8. The camera optical lens further satisfies the following condition: $2.00 \leq R7/R8 \leq 15.00$, which specifies a shape of the fourth lens L4. When the value is within this range, it is beneficial for correcting astigmatism and distortion of the camera optical lens so that $|Distortion| \leq 11\%$, and so that the brightness or saturation can be maintained.

In the present embodiment, an object side surface of the first lens L1 is convex in a paraxial region and an image side surface of the first lens L1 is convex in the paraxial region. In other optional embodiments, the object side surface and the image side surface of the first lens L1 can also be set to other concave and convex distribution situations.

A central curvature radius of the object side surface of the first lens L1 is defined as R1, and a central curvature radius of the image side surface of the first lens L1 is defined as R2. The camera optical lens 10 further satisfies the following condition: $-1.96 \le (R1+R2)/(R1-R2) \le -0.06$.

This condition reasonably controls a shape of the first lens L1, so that the first lens L1 can effectively correct a spherical aberration of the camera optical lens 10. Preferably, the following condition shall be satisfied, $-1.22 \le (R1+R2)/(R1-R2) \le -0.08$.

An on-axis thickness of the first lens L1 is defined as d1. A total optical length from the object side surface of the first lens L1 to the image surface S1 of the camera optical lens 10 along an optical axis is defined as TTL. The camera optical lens 10 further satisfies the following condition: $0.04 \le d1/TTL \le 0.22$. When the value is within this range, it benefits for realizing the ultra-thin effect. Preferably, the following condition shall be satisfied, $0.06 \le d1/TTL \le 0.18$.

In the present embodiment, the object side surface of the second lens L2 is convex in the paraxial region and the image side surface of the second lens L2 is convex in the paraxial region. In other optional embodiments, the object side surface and the image side surface of the second lens L2 can also be set to other concave and convex distribution situations.

The focal length of the camera optical lens 10 is defined as f, and a focal length of the second lens L2 is defined as f2. The camera optical lens 10 further satisfies the following condition: $f2/f \le 135.44$. By a reasonable distribution of the refractive power, which makes it is possible that the camera optical lens 10 has the excellent imaging quality and the lower sensitivity. Preferably, the following condition shall be satisfied, $f2/f \le 108.36$.

An on-axis thickness of the second lens L2 is defined as d3. The total optical length from the object side surface of the first lens L1 to the image surface S1 of the camera optical lens 10 along the optical axis is defined as TTL. The camera optical lens 10 further satisfies the following condition: $0.05 \le d3/TTL \le 0.24$. When the value is within this range, it benefits for realizing the ultra-thin effect. Preferably, the following condition shall be satisfied, $0.07 \le d3/TTL \le 0.19$.

In the present embodiment, an object side surface of the third lens L3 is concave in the paraxial region and an image side surface of the third lens L3 is convex in the paraxial region. In other optional embodiments, the object side surface and the image side surface of the third lens L3 can also be set to other concave and convex distribution situations.

The focal length of the camera optical lens 10 is defined as f, and a focal length of the third lens L3 is defined as f3. The camera optical lens 10 further satisfies the following condition: $-3.43 \le f3/f \le -0.95$. By a reasonable distribution of the refractive power, which makes it is possible that the camera optical lens 10 has the excellent imaging quality and the lower sensitivity. Preferably, the following condition shall be satisfied, $-2.15 \le f3/f \le -1.19$.

A central curvature radius of the object side surface of the third lens L3 is defined as R5, and a central curvature radius of the image side surface of the third lens L3 is defined as R6. The camera optical lens 10 further satisfies the following condition: $-5.46 \le (R5+R6)/(R5-R6) \le -1.09$, which specifies a shape of the third lens 13. It benefits for molding of the third lens L3. When the value is within this range, a degree of deflection of light passing through the lens can be alleviated, and an aberration can be reduced effectively. Preferably, the following condition shall be satisfied, $-3.41 \le (R5+R6)/(R5-R6) \le -1.36$.

An on-axis thickness of the third lens L3 is defined as d5. The total optical length from the object side surface of the first lens L1 to the image surface S1 of the camera optical lens 10 along the optical axis is defined as TTL. The camera optical lens 10 further satisfies the following condition: $0.03 \le d5/TTL \le 0.12$, which benefits for realizing the ultra-thin effect. Preferably, the following condition shall be satisfied, $0.04 \le d5/TTL \le 0.09$.

In the present embodiment, the object side surface of the fourth lens L4 is concave in the paraxial region and the image side surface of the fourth lens L4 is convex in the paraxial region. In other optional embodiments, the object side surface and the image side surface of the fourth lens L4 can also be set to other concave and convex distribution situations.

The focal length of the camera optical lens 10 is defined as f, and a focal length of the fourth lens L4 is defined as f4. The camera optical lens 10 further satisfies the following condition: $0.43 \le f4/f \le 1.84$. By a reasonable distribution of the refractive power, which makes it is possible that the camera optical lens 10 has the excellent imaging quality and the lower sensitivity. Preferably, the following condition shall be satisfied, $0.68 \le f4/f \le 1.47$.

The curvature radius of the object side surface of the fourth lens L4 is defined as R7, and the central curvature radius of the image side surface of the fourth lens L4 is defined as R8. The camera optical lens further satisfies the following condition: $0.57 \le (R7+R8)/(R7-R8) \le 4.44$, which specifies a shape of the fourth lens L4. When the value is within this range, as the development of the ultra-thin and wide-angle lenses, it benefits for solving the problems, such as correcting an off-axis aberration. Preferably, the following condition shall be satisfied, $0.92 \le (R7+R8)/(R7-R8) \le 3.55$.

An on-axis thickness of the fourth lens L4 is defined as d7. The total optical length from the object side surface of the first lens L1 to the image surface S1 of the camera optical lens 10 along the optical axis is defined as TTL. The camera optical lens 10 further satisfies the following condition: $0.06 \le d7/TTL \le 0.27$, which benefits for realizing the ultra-thin effect. Preferably, the following condition shall be satisfied, $0.10 \le d7/TTL \le 0.22$.

In the present embodiment, an object side surface of the fifth lens L5 is convex in the paraxial region and an image side surface of the fifth lens L5 is concave in the paraxial region. In other optional embodiments, the object side surface and the image side surface of the fifth lens L5 can also be set to other concave and convex distribution situations.

The focal length of the camera optical lens 10 is defined as f, and a focal length of the fifth lens L5 is defined as f5. The camera optical lens 10 further satisfies the following condition: $-14.55 \le f5/f \le -1.58$, when the value is within this range, a light angle of the camera optical lens 10 can be smoothed effectively and the sensitivity of the tolerance can be reduced. Preferably, the following condition shall be satisfied, $-9.10 \le f5/f \le -1.98$.

A central curvature radius of the object side surface of the fifth lens L5 is defined as R9, and a central curvature radius of the image side surface of the fifth lens L5 is defined as R10. The camera optical lens further satisfies the following condition: $2.14 \leq (R9+R10)/(R9-R10) \leq 9.13$, which specifies a shape of the fifth lens L5. When the value is within this range, as the development of the ultra-thin and wide-angle lenses, it benefits for solving the problems, such as correcting the off-axis aberration. Preferably, the following condition shall be satisfied, $3.42 \leq (R9+R10)/(R9-R10) \leq 7.30$.

An on-axis thickness of the fifth lens L5 is defined as d9. The total optical length from the object side surface of the first lens L1 to the image surface S1 of the camera optical lens 10 along the optical axis is defined as TTL. The camera optical lens 10 further satisfies the following condition: $0.04 \leq d9/TTL \leq 0.25$. When the value is within this range, it benefits for realizing the ultra-thin effect. Preferably, the following condition shall be satisfied, $0.07 \leq d9/TTL \leq 0.20$.

In the present embodiment, the focal length of the camera optical lens 10 is f, and a combined focal length of the first lens L1 and the second lens L2 is defined as f12. The camera optical lens 10 further satisfies the following condition: $0.63 \leq f12/f \leq 2.61$. This condition can eliminate aberration and a distortion of the camera optical lens 10, reduce a back focal length of the camera optical lens 10, and maintain the miniaturization of the camera lens system group. Preferably, the following condition shall be satisfied, $1.00 \leq f12/f \leq 2.09$.

In the present embodiment, a field of view of the camera optical lens 10 in a diagonal direction is defined as FOV. The FOV is greater than or equal to 102.70°, thereby achieving the wide-angle performance. Preferably, the FOV is greater than or equal to 104.00°.

In the present embodiment, an image height of the camera optical lens 10 is defined as IH. The total optical length from the object side surface of the first lens L1 to the image surface S1 of the camera optical lens 10 along an optical axis is defined as TTL. The camera optical lens 10 further satisfies the following condition: $TTL/IH \leq 1.47$, thereby achieving the ultra-thin performance. Preferably, the following condition shall be satisfied, $TTL/IH \leq 1.41$.

In the present embodiment, an F number (FNO) of the camera optical lens 10 is smaller than or equal to 2.36, thereby achieving a large aperture and good imaging performance. Preferably, the FNO of the camera optical lens 10 is smaller than or equal to 2.30.

When satisfying above conditions, which makes it is possible that the camera optical lens has excellent optical performances, and meanwhile can meet design requirements of an ultra-thin, wide-angle lenses having large aperture. According the characteristics of the camera optical lens 10, it is particularly suitable for a mobile camera lens component and a WEB camera lens composed of high pixel CCD, CMOS.

The following examples will be used to describe the camera optical lens 10 of the present invention. The symbols recorded in each example will be described as follows. The focal length, on-axis distance, central curvature radius, on-axis thickness, inflexion point position, and arrest point position are all in units of mm.

TTL: the total optical length from the object side surface of the first lens L1 to the image surface S1 of the camera optical lens 10 along the optical axis, the unit of TTL is mm.

F number (FNO): the ratio of an effective focal length of the camera optical lens 10 to an entrance pupil diameter (ENPD).

Preferably, inflexion points and/or arrest points can also be arranged on the object side surface and/or image side surface of the lens, so that the demand for high quality imaging can be satisfied, the description below can be referred for specific implementable scheme.

The design information of the camera optical lens 10 in Embodiment 1 of the present invention is shown in the tables 1 and 2.

TABLE 1

|  | R |  | d | nd |  | vd |  |
|---|---|---|---|---|---|---|---|
| S1 | ∞ | d0= | 0.006 |  |  |  |  |
| R1 | 2.976 | d1= | 0.358 | nd1 | 1.5444 | v1 | 55.95 |
| R2 | −13.821 | d2= | 0.244 |  |  |  |  |
| R3 | 10.416 | d3= | 0.407 | nd2 | 1.5444 | v2 | 55.95 |
| R4 | −12.215 | d4= | 0.227 |  |  |  |  |
| R5 | −1.464 | d5= | 0.230 | nd3 | 1.6700 | v3 | 19.24 |
| R6 | −3.155 | d6= | 0.030 |  |  |  |  |
| R7 | −6.189 | d7= | 0.620 | nd4 | 1.5444 | v4 | 55.95 |
| R8 | −1.278 | d8= | 0.032 |  |  |  |  |
| R9 | 1.114 | d9= | 0.660 | nd5 | 1.5346 | v5 | 56.12 |
| R10 | 0.708 | d10= | 0.672 |  |  |  |  |
| R11 | ∞ | d11= | 0.210 | ndg | 1.5168 | vg | 64.17 |
| R12 | ∞ | d12= | 0.280 |  |  |  |  | where, the meaning of the various symbols is as follows.
S1: aperture;
R: curvature radius of an optical surface, a central curvature radius for a lens;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the fifth lens L5;
R10: central curvature radius of the image side surface of the fifth lens L5;
R11: central curvature radius of an object side surface of the optical filter GF;
R12: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;

d9: on-axis thickness of the fifth lens L5;
d10: on-axis distance from the image side surface of the fifth lens L5 to the object side surface of the optical filter GF;
d11: on-axis thickness of the optical filter GF;
d12: on-axis distance from the image side surface of the optical filter GF to the image surface;
nd: refractive index of d line (d-line is green light with a wavelength of 550 nm);
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF;

Table 2 shows the aspherical surface data of the camera optical lens 10 in Embodiment 1 of the present invention.

distance of r from the optic axis, and a surface tangent to a vertex of the aspherical surface on the optic axis).

Table 3 and Table 4 show design data of inflexion points and arrest points of respective lens in the camera optical lens 10 according to Embodiment 1 of the present invention. P1R1 and P1R2 represent the object side surface and the image side surface of the first lens L1, P2R1 and P2R2 represent the object side surface and the image side surface of the second lens L2, P3R1 and P3R2 represent the object side surface and the image side surface of the third lens L3, P4R1 and P4R2 represent the object side surface and the image side surface of the fourth lens L4, and P5R1 and P5R2 represent the object side surface and the image side surface of the fifth lens L5. The data in the column named "inflexion point position" refers to vertical distances from inflexion points arranged on each lens surface to the optical axis of the camera optical lens 10. The data in the column named "arrest point position" refers to vertical distances from arrest points arranged on each lens surface to the optical axis of the camera optical lens 10.

TABLE 2

| | Conic coefficient | Aspheric surface coefficients | | | | |
|---|---|---|---|---|---|---|
| | k | A4 | A6 | A8 | A10 | A12 |
| R1 | −6.9126E+01 | 3.4333E−01 | −5.5663E+00 | 6.8877E+01 | −6.1759E+02 | 3.6030E+03 |
| R2 | 2.6158E+02 | −2.7187E−01 | −3.0595E−01 | −1.2533E+00 | 3.1850E+01 | −2.5300E+02 |
| R3 | 1.4398E+02 | −5.8892E−01 | 3.9316E+00 | −3.2020E+01 | 1.5593E+02 | −4.9290E+02 |
| R4 | −1.6982E+02 | −6.7899E−01 | 1.8555E+00 | −4.2456E+00 | 4.2219E−01 | 1.5666E+01 |
| R5 | 1.1716E+00 | −2.1767E+00 | 8.8733E+00 | −1.5859E+01 | −5.2407E+00 | 9.5049E+01 |
| R6 | −3.4142E+01 | −1.3696E+00 | 5.7869E+00 | −1.8747E+01 | 4.1184E+01 | −5.7975E+01 |
| R7 | −5.7956E+01 | 1.1474E+00 | −3.2573E+00 | 5.5971E+00 | −6.4794E+00 | 5.1539E+00 |
| R8 | −2.7374E+00 | 3.7229E−01 | 6.4047E−02 | −1.2894E+00 | 2.1210E+00 | −1.7656E+00 |
| R9 | −3.8775E+00 | −1.9129E−01 | 8.7870E−02 | −2.1559E−01 | 2.3533E−01 | −1.2376E−01 |
| R10 | −3.7553E+00 | −4.7008E−02 | −4.6129E−02 | 5.9133E−02 | −3.4118E−02 | 1.1781E−02 |

| | Conic coefficient | Aspheric surface coefficients | | | |
|---|---|---|---|---|---|
| | k | A14 | A16 | A18 | A20 |
| R1 | −6.9126E+01 | −1.3498E+04 | 3.1262E+04 | −4.0714E+04 | 2.2790E+04 |
| R2 | 2.6158E+02 | 1.0286E+03 | −2.3076E+03 | 2.7182E+03 | −1.3056E+03 |
| R3 | 1.4398E+02 | 1.0067E+03 | −1.2700E+03 | 8.9986E+02 | −2.7394E+02 |
| R4 | −1.6982E+02 | −2.6263E+01 | 1.0568E+01 | 8.0945E+00 | −5.6499E+00 |
| R5 | 1.1716E+00 | −2.1466E+02 | 2.3495E+02 | −1.2961E+02 | 2.8802E+01 |
| R6 | −3.4142E+01 | 5.1469E+01 | −2.7855E+01 | 8.4091E+00 | −1.0886E+00 |
| R7 | −5.7956E+01 | −2.7807E+00 | 9.6900E−01 | −1.9578E−01 | 1.7321E−02 |
| R8 | −2.7374E+00 | 8.6743E−01 | −2.5449E−01 | 4.1271E−02 | −2.8473E−03 |
| R9 | −3.8775E+00 | 3.7345E−02 | −6.8183E−03 | 7.1825E−04 | −3.4033E−05 |
| R10 | −3.7553E+00 | −2.5395E−03 | 3.3425E−04 | −2.4579E−05 | 7.7412E−07 |

For convenience, an aspheric surface of each lens surface uses the aspheric surfaces shown in the below condition (1). However, the present invention is not limited to the aspherical polynomials form shown in the condition (1).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20} \quad (1)$$

Where, K is a conic coefficient, A4, A6, A8, A10, A12, A14, A16, A18, A20 are aspheric surface coefficients. c is the curvature at the center of the optical surface. r is a vertical distance between a point on an aspherical curve and the optic axis, and z is an aspherical depth (a vertical distance between a point on an aspherical surface, having a

TABLE 3

| | Number of inflexion points | Inflexion point position 1 | Inflexion point position 2 | Inflexion point position 3 | Inflexion point position 4 |
|---|---|---|---|---|---|
| P1R1 | 1 | 0.375 | / | / | / |
| P1R2 | 1 | 0.685 | / | / | / |
| P2R1 | 2 | 0.145 | 0.715 | / | / |
| P2R2 | 1 | 0.855 | / | / | / |
| P3R1 | 2 | 0.785 | 0.935 | / | / |
| P3R2 | 1 | 0.765 | / | / | / |
| P4R1 | 2 | 0.115 | 0.785 | / | / |

TABLE 3-continued

|  | Number of inflexion points | Inflexion point position 1 | Inflexion point position 2 | Inflexion point position 3 | Inflexion point position 4 |
|---|---|---|---|---|---|
| P4R2 | 4 | 0.425 | 0.685 | 0.965 | 1.405 |
| P5R1 | 3 | 0.485 | 1.285 | 1.945 | / |
| P5R2 | 2 | 0.605 | 2.505 | / | / |

TABLE 4

|  | Number of arrest points | Arrest point position 1 | Arrest point position 2 |
|---|---|---|---|
| P1R1 | 1 | 0.565 | / |
| P1R2 | 0 | / | / |
| P2R1 | 1 | 0.255 | / |
| P2R2 | 0 | / | / |
| P3R1 | 0 | / | / |
| P3R2 | 1 | 1.065 | / |
| P4R1 | 2 | 0.205 | 1.265 |
| P4R2 | 0 | / | / |
| P5R1 | 1 | 0.875 | / |
| P5R2 | 1 | 1.595 | / |

Figure 2:
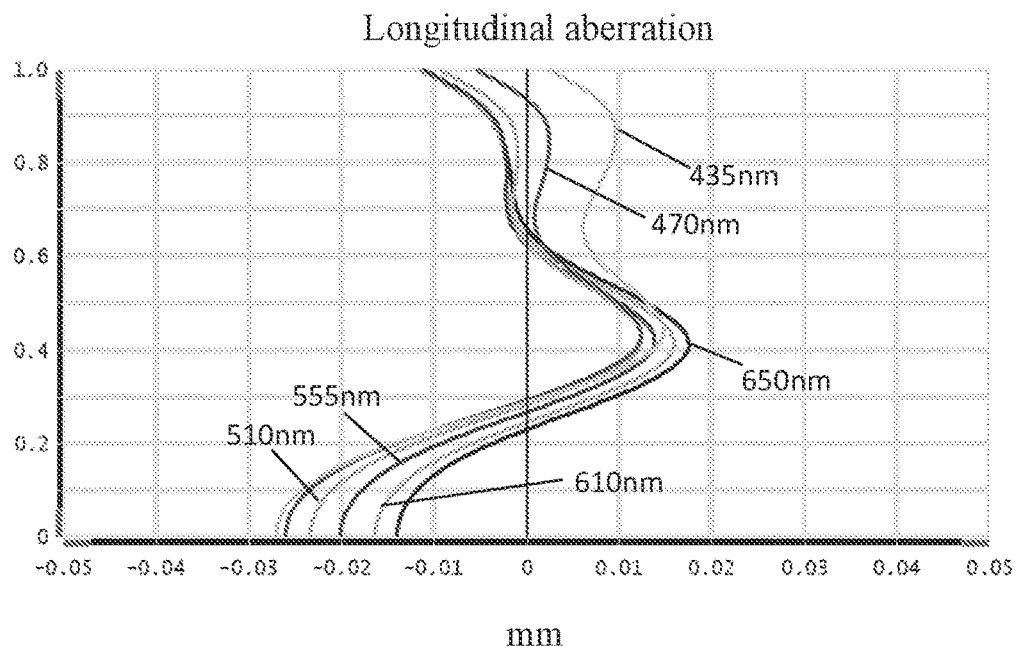
FIG. 2 is a schematic diagram of a longitudinal aberration of the camera optical lens shown in FIG. 1.
Figure 3:
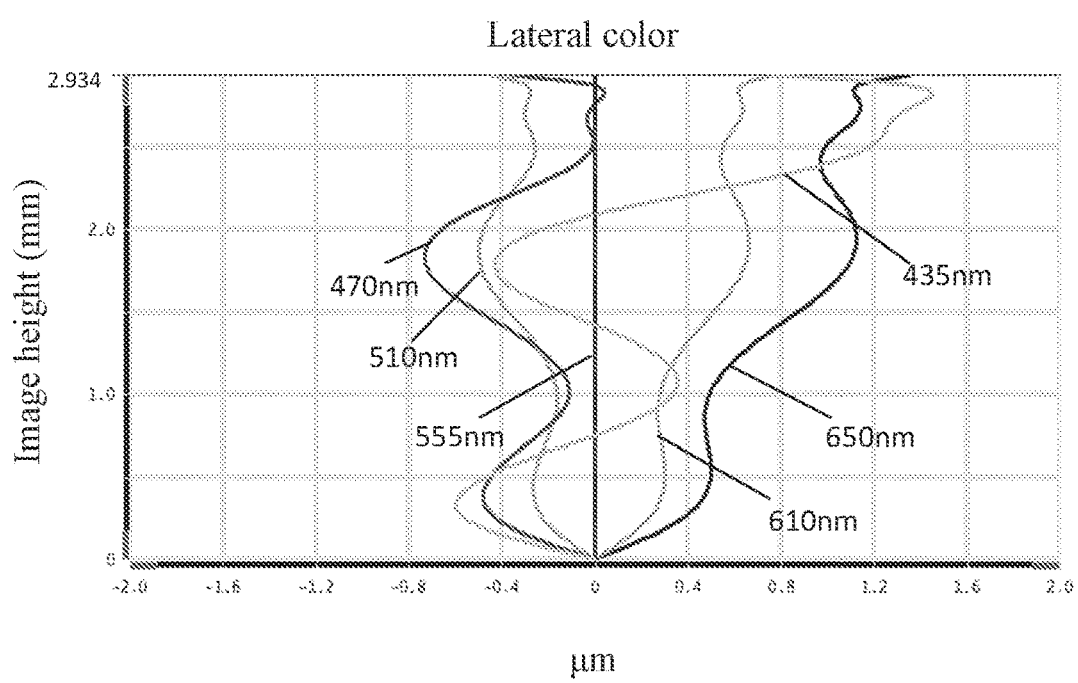
FIG. 3 is a schematic diagram of a lateral color of the camera optical lens shown in FIG. 1.
Figure 4:
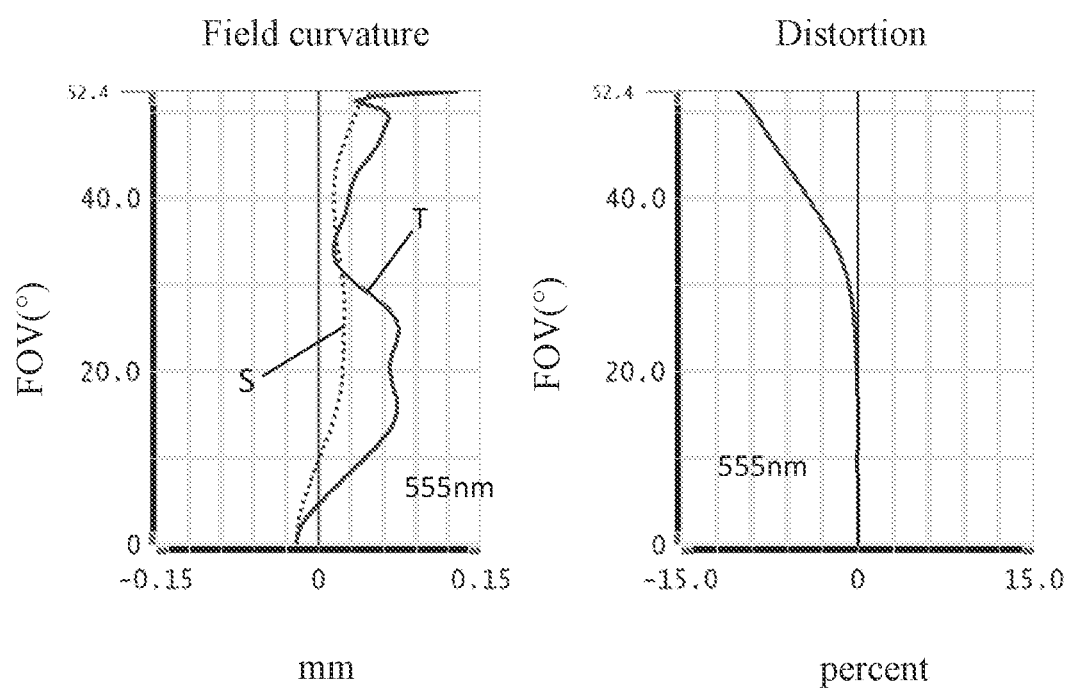
FIG. 4 is a schematic diagram of a field curvature and a distortion of the camera optical lens shown in FIG. 1.

FIG. 2 and FIG. 3 respectively illustrate a longitudinal aberration and a lateral color of light with wavelengths of 650 nm, 610 nm, 555 nm, 510 nm, 470 nm and 435 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 21 in the following shows various values of Embodiments 1, 2, 3,4 and Comparative Embodiment, and also values corresponding to parameters which are specified in the above conditions. As shown in Table 21, Embodiment 1 satisfies the above conditions.

In the present embodiment, the entrance pupil diameter (ENPD) of the camera optical lens 10 is 1.087 mm. The image height of 1.0H is 2.934 mm. The FOV is 104.80°. Thus, the camera optical lens 10 satisfies design requirements of large aperture, ultra-thin and wide-angle while the on-axis and off-axis aberrations are sufficiently corrected, thereby achieving excellent optical characteristics.

Embodiment 2

Embodiment 2 is basically the same as Embodiment 1, the meaning of its symbols is the same as that of Embodiment 1, in the following, only the differences are listed.

Figure 5:
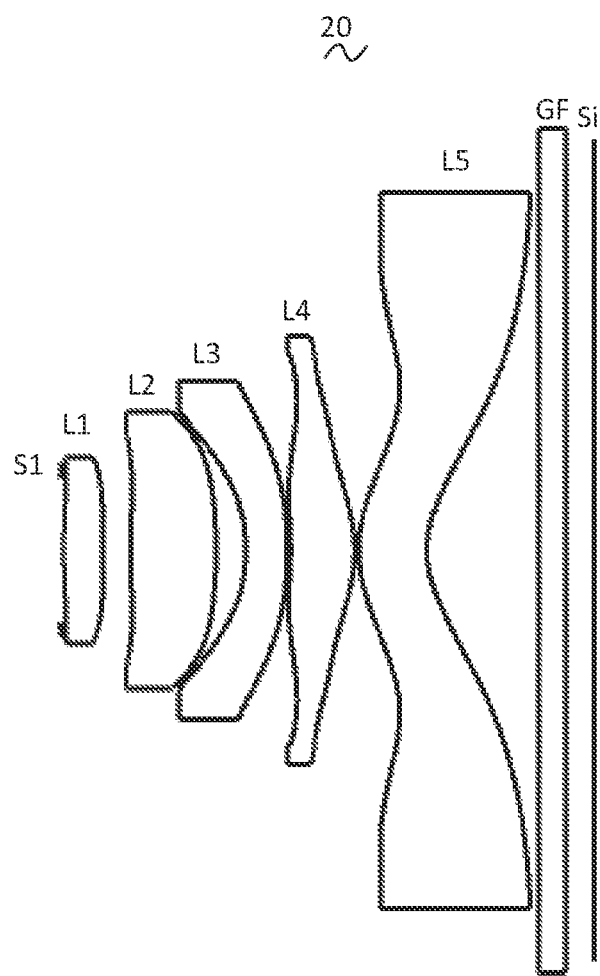
FIG. 5 is a schematic diagram of a structure of a camera optical lens in accordance with Embodiment 2 of the present invention.

FIG. 5 shows a schematic diagram of a structure of a camera optical lens 20 according to Embodiment 2 of the present invention. Table 5 and table 6 show the design data of a camera optical lens 20 in Embodiment 2 of the present invention.

TABLE 5

|  | R | d |  | nd |  | vd |
|---|---|---|---|---|---|---|
| S1 | ∞ | d0= | 0.021 |  |  |  |
| R1 | 4.015 | d1= | 0.302 | nd1 | 1.5444 | v1 55.95 |
| R2 | −353.138 | d2= | 0.218 |  |  |  |
| R3 | 5.141 | d3= | 0.658 | nd2 | 1.5444 | v2 55.95 |
| R4 | −5.141 | d4= | 0.230 |  |  |  |
| R5 | −1.498 | d5= | 0.318 | nd3 | 1.6700 | v3 19.24 |
| R6 | −3.975 | d6= | 0.032 |  |  |  |
| R7 | −1.962 | d7= | 0.496 | nd4 | 1.5444 | v4 55.95 |
| R8 | −0.971 | d8= | 0.030 |  |  |  |
| R9 | 0.843 | d9= | 0.528 | nd5 | 1.5346 | v5 56.12 |
| R10 | 0.605 | d10= | 0.872 |  |  |  |
| R11 | ∞ | d11= | 0.210 | ndg | 1.5168 | vg 64.17 |
| R12 | ∞ | d12= | 0.219 |  |  |  |

Table 6 shows aspherical surface data of each lens of the camera optical lens 20 in Embodiment 2 of the present invention.

TABLE 6

|  | Conic coefficient | Aspheric surface coefficients | | | | |
|---|---|---|---|---|---|---|
|  | k | A4 | A6 | A8 | A10 | A12 |
| R1 | −1.6959E+02 | 1.3905E−01 | −1.4753E+00 | 2.0495E+00 | 4.4141E+01 | −5.0625E+02 |
| R2 | −4.7335E+05 | −3.4618E−01 | 5.2685E−01 | −9.2451E+00 | 6.8930E+01 | −3.0024E+02 |
| R3 | 3.2470E+01 | −2.5094E−01 | 2.8633E−01 | −2.8678E+00 | 1.2906E+01 | −4.1096E+01 |
| R4 | −1.1983E+02 | −4.8794E−01 | 6.5201E−01 | 1.5607E+00 | −1.5148E+01 | 4.7405E+01 |
| R5 | 1.0529E+00 | −1.3294E+00 | 3.2466E+00 | 2.9309E+00 | −3.4514E+01 | 9.3711E+01 |
| R6 | −9.3167E+01 | −7.7070E−01 | 1.8840E+00 | −3.1921E+00 | 3.3403E+00 | −1.9267E+00 |
| R7 | −5.0477E+01 | 8.1278E−01 | −1.8802E+00 | 2.9184E+00 | −3.2933E+00 | 2.5306E+00 |
| R8 | −2.7681E+00 | 3.0124E−01 | −1.0335E−01 | −3.1038E−02 | −1.5853E−01 | 2.9458E−01 |
| R9 | −2.6419E+00 | −1.7056E−01 | 1.6269E−01 | −1.9380E−01 | 1.1359E−01 | −2.9826E−02 |
| R10 | −3.2183E+00 | 4.9932E−02 | −1.2619E−01 | 8.9937E−02 | −3.6830E−02 | 9.6599E−03 |

|  | Conic coefficient | Aspheric surface coefficients | | | |
|---|---|---|---|---|---|
|  | k | A14 | A16 | A18 | A20 |
| RI | −1.6959E+02 | 2.6377E+03 | −7.5181E+03 | 1.1185E+04 | −6.7207E+03 |
| R2 | −4.7335E+05 | 7.6868E+02 | −1.0829E+02 | 6.8235E+02 | −6.5973E+01 |
| R3 | 3.2470E+01 | 8.8408E+01 | −1.1346E+02 | 7.5808E+01 | −1.9715E+01 |
| R4 | −1.1983E+02 | −8.5290E+01 | 9.2133E+01 | −5.4795E+01 | 1.3678E+01 |
| R5 | 1.0529E+00 | −1.4077E+02 | 1.2691E+02 | −6.4244E+01 | 1.4057E+01 |
| R6 | −9.3167E+01 | 5.0293E−01 | −7.7420E−02 | 7.1520E−02 | −2.6483E−02 |
| R7 | −5.0477E+01 | −1.2489E+00 | 3.6371E−01 | −5.1655E−02 | 1.8197E−03 |
| R8 | −2.7681E+00 | −2.1416E−01 | 8.6985E−02 | −2.0014E−02 | 2.0164E−03 |

TABLE 6-continued

| | | | | |
|---|---|---|---|---|
| R9 | −2.6419E+00 | 1.3682E−03 | 1.0723E−03 | −2.3949E−04 | 1.6136E−05 |
| R10 | −3.2183E+00 | −1.6479E−03 | 1.7700E−04 | −1.0872E−05 | 2.9113E−07 |

Table 7 and table 8 show design data of inflexion points and arrest points of respective lens in the camera optical lens 20 according to Embodiment 2 of the present invention.

TABLE 7

| | Number of inflexion points | Inflexion point position 1 | Inflexion point position 2 | Inflexion point position 3 | Inflexion point position 4 |
|---|---|---|---|---|---|
| P1R1 | 1 | 0.315 | / | / | / |
| P1R2 | 0 | / | / | / | / |
| P2R1 | 2 | 0.285 | 0.795 | / | / |
| P2R2 | 1 | 0.975 | / | / | / |
| P3R1 | 1 | 0.895 | / | / | / |
| P3R2 | 1 | 1.055 | / | / | / |
| P4R1 | 2 | 0.195 | 0.765 | / | / |
| P4R2 | 4 | 0.475 | 0.855 | 1.125 | 1.385 |
| P5R1 | 2 | 0.615 | 1.535 | / | / |
| P5R2 | 2 | 0.725 | 2.605 | / | / |

TABLE 8

| | Number of arrest points | Arrest point position 1 | Arrest point position 2 |
|---|---|---|---|
| P1R1 | 1 | 0.495 | / |
| P1R2 | 0 | / | / |
| P2R1 | 1 | 0.465 | / |
| P2R2 | 0 | / | / |
| P3R1 | 0 | / | / |
| P3R2 | 0 | / | / |
| P4R1 | 2 | 0.385 | 1.065 |
| P4R2 | 0 | / | / |
| P5R1 | 1 | 1.175 | / |
| P5R2 | 1 | 2.555 | / |

Figure 6:
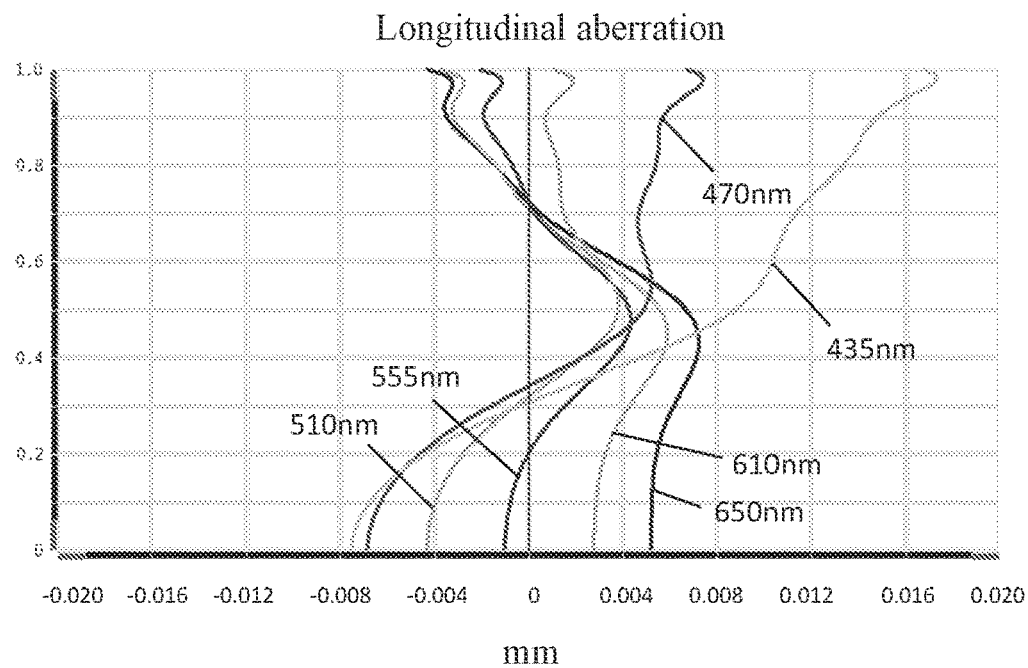
FIG. 6 is a schematic diagram of a longitudinal aberration of the camera optical lens shown in FIG. 5.
Figure 7:
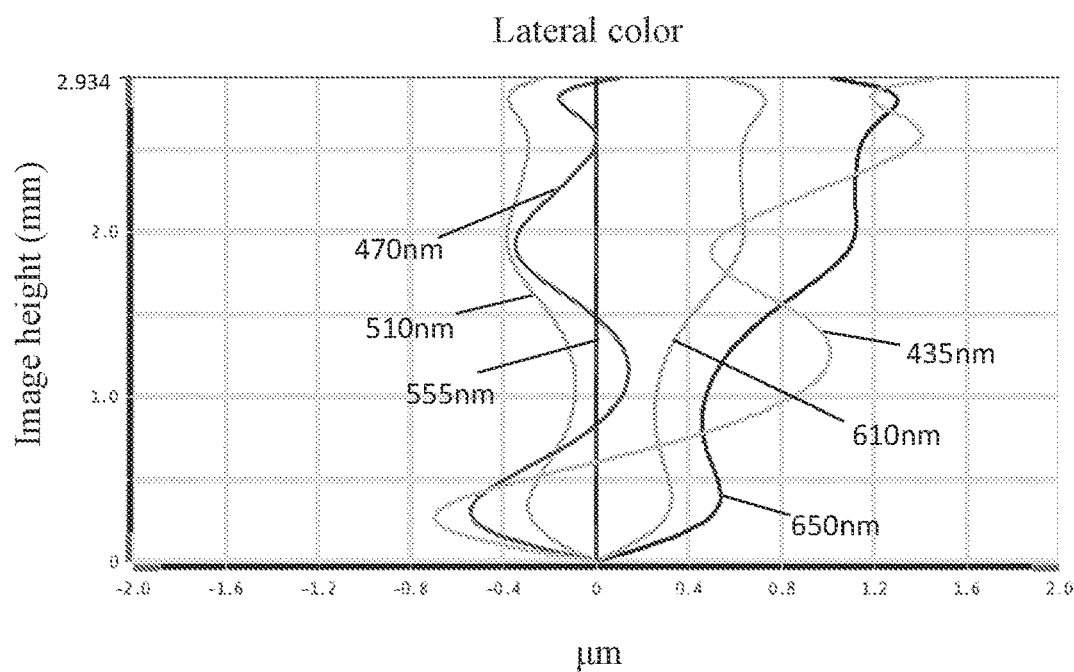
FIG. 7 is a schematic diagram of a lateral color of the camera optical lens shown in FIG. 5.
Figure 8:
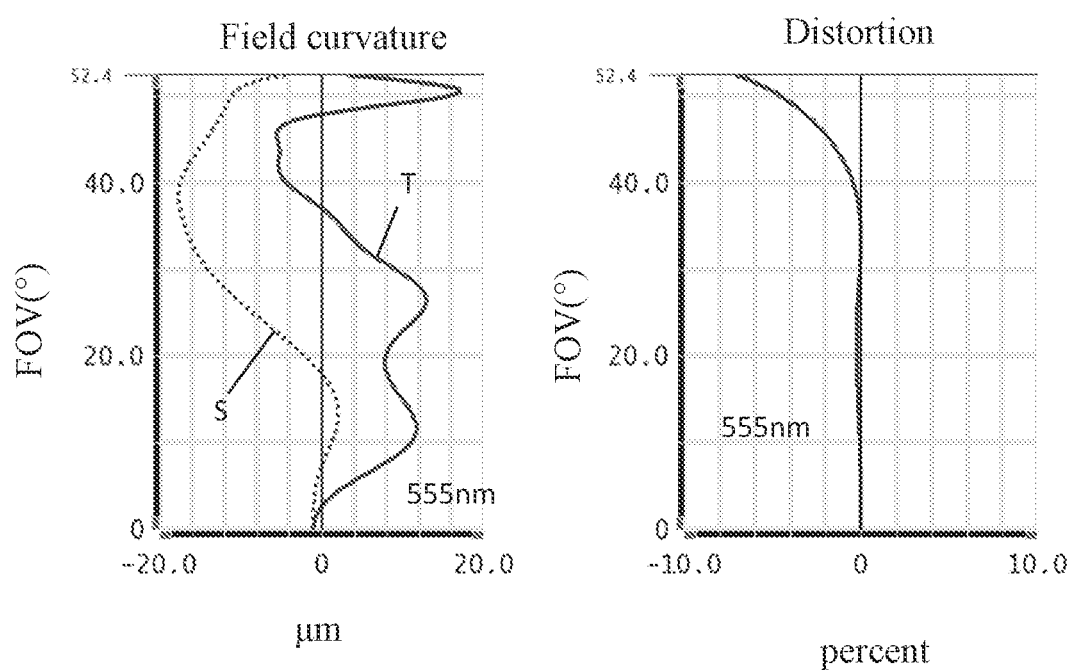
FIG. 8 is a schematic diagram of a field curvature and a distortion of the camera optical lens shown in FIG. 5.
Figure 9:
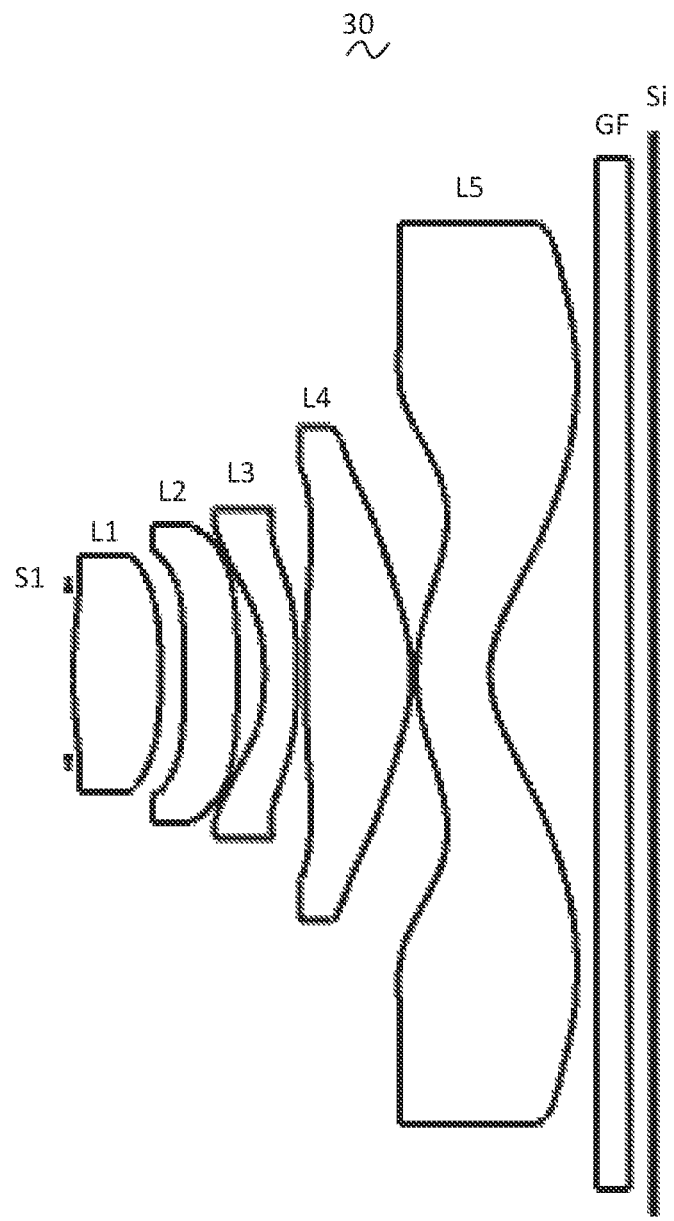
FIG. 9 is a schematic diagram of a structure of a camera optical lens in accordance with Embodiment 3 of the present invention.

FIG. 6 and FIG. 7 respectively illustrate a longitudinal aberration and a lateral color of light with wavelengths of 650 nm, 610 nm, 555 nm, 510 nm, 470 nm and 435 nm after passing the camera optical lens 20 according to Embodiment 2. FIG. 8 illustrates a field curvature and a distortion of light with a wavelength of 555 nm after passing the camera optical lens 10 according to Embodiment 2, in which a field curvature S is a field curvature in a sagittal direction and T is a field curvature in a tangential direction.

As shown in Table 21, Embodiment 2 satisfies the above conditions.

In the present embodiment, an entrance pupil diameter (ENPD) of the camera optical lens is 1.066 mm. An image height of 1.0H is 2.934 mm. An FOV is 104.80°. Thus, the camera optical lens 20 satisfies design requirements of large aperture, ultra-thin and wide-angle while the on-axis and off-axis aberrations are sufficiently corrected, thereby achieving excellent optical characteristics.

Embodiment 3

Embodiment 3 is basically the same as Embodiment 1 and involves symbols having the same meanings as Embodiment 1, and only differences therebetween will be described in the following.

Tables 9 and 10 show design data of a camera optical lens 30 in Embodiment 3 of the present invention.

TABLE 9

| | R | d | | nd | | vd |
|---|---|---|---|---|---|---|
| S1 | ∞ | d0= | 0.036 | | | |
| R1 | 2.544 | d1= | 0.551 | nd1 | 1.5444 | v1 55.95 |
| R2 | −4.095 | d2= | 0.151 | | | |
| R3 | 112.825 | d3= | 0.340 | nd2 | 1.5444 | v2 55.95 |
| R4 | −5527.620 | d4= | 0.170 | | | |
| R5 | −1.618 | d5= | 0.206 | nd3 | 1.6700 | v3 19.24 |
| R6 | −6.716 | d6= | 0.064 | | | |
| R7 | −15.501 | d7= | 0.663 | nd4 | 1.5444 | v4 55.95 |
| R8 | −1.040 | d8= | 0.030 | | | |
| R9 | 0.921 | d9= | 0.471 | nd5 | 1.5346 | v5 56.12 |
| R10 | 0.572 | d10= | 0.672 | | | |
| R11 | ∞ | d11= | 0.210 | ndg | 1.5168 | vg 64.17 |
| R12 | ∞ | d12= | 0.168 | | | |

Table 10 shows aspherical surface data of each lens of the camera optical lens 30 in Embodiment 3 of the present invention.

TABLE 10

| | Conic coefficient | Aspheric surface coefficients | | | | |
|---|---|---|---|---|---|---|
| | k | A4 | A6 | A8 | A10 | A12 |
| R1 | −5.2536E+01 | 2.9121E−01 | −2.2552E+00 | 1.7222E+01 | −1.4231E+02 | 8.0808E+02 |
| R2 | 3.0420E+01 | −4.7004E−01 | 6.3877E−01 | −4.3905E+00 | 1.3274E+01 | 2.5553E+00 |
| R3 | −2.1720E+05 | −6.8306E−01 | 1.7723E+00 | −1.6682E+01 | 1.0352E+02 | −4.5132E+02 |
| R4 | −1.1120E+05 | −7.7319E−01 | 2.2235E+00 | −7.7792E+00 | 2.1649E+01 | −4.0976E+01 |
| R5 | 9.7029E−01 | −1.7667E+00 | 6.0117E+00 | −1.2196E+01 | 2.7992E+01 | −6.6944E+01 |
| R6 | −3.5469E+02 | −1.3470E+00 | 5.0141E+00 | −1.7053E+01 | 4.7013E+01 | −9.1405E+01 |
| R7 | 2.3629E+01 | 5.7419E−01 | −1.4764E+00 | 1.8884E+00 | −9.2764E−01 | −1.3493E+00 |
| R8 | −1.9331E+00 | 1.7638E−01 | 5.6022E−01 | −1.9206E+00 | 2.7109E+00 | −2.3144E+00 |
| R9 | −5.1141E+00 | 3.8687E−02 | −4.1039E−01 | 4.6437E−01 | −3.4576E−01 | 1.7332E−01 |
| R10 | −2.7314E+00 | −1.1883E−01 | 2.2257E−02 | 1.4323E−02 | −1.2183E−02 | 4.2843E−03 |

TABLE 10-continued

| | Conic coefficient | Aspheric surface coefficients | | | |
|---|---|---|---|---|---|
| | k | A14 | A16 | A18 | A20 |
| R1 | −5.2536E+01 | −2.8159E+03 | 5.3267E+03 | −4.1665E+03 | −8.5126E+01 |
| R2 | 3.0420E+01 | −1.4847E+02 | 4.7142E+02 | −6.6436E+02 | 3.7420E+02 |
| R3 | −2.1720E+05 | 1.3033E+03 | −2.3455E+03 | 2.3526E+03 | −1.0067E+03 |
| R4 | −1.1120E+05 | 4.0211E+01 | −1.1130E+01 | −1.0128E+01 | 5.9939E+00 |
| R5 | 9.7029E−01 | 1.1709E+02 | −1.2609E+02 | 7.4281E+01 | −1.8304E+01 |
| R6 | −3.5469E+02 | 1.1938E+02 | −9.7951E+01 | 4.5064E+01 | −8.8146E+00 |
| R7 | 2.3629E+01 | 2.9642E+00 | −2.4634E+00 | 1.0101E+00 | −1.7014E−01 |
| R8 | −1.9331E+00 | 1.2466E+00 | −3.9767E−01 | 6.5372E−02 | −3.9630E−03 |
| R9 | −5.1141E+00 | −5.3546E−02 | 9.5642E−03 | −8.9197E−04 | 3.2751E−05 |
| R10 | −2.7314E+00 | −8.5385E−04 | 9.8624E−05 | −6.0507E−06 | 1.4840E−07 |

Table 11 and table 12 show Embodiment 3 design data of inflexion points and arrest points of respective lens in the camera optical lens 30 according to Embodiment 3 of the present invention.

TABLE 11

| | Number of inflexion points | Inflexion point position 1 | Inflexion point position 2 | Inflexion point position 3 | Inflexion point position 4 |
|---|---|---|---|---|---|
| P1R1 | 1 | 0.395 | / | / | / |
| P1R2 | 0 | / | / | / | / |
| P2R1 | 1 | 0.035 | / | / | / |
| P2R2 | 0 | / | / | / | / |
| P3R1 | 1 | 0.585 | / | / | / |
| P3R2 | 1 | 0.655 | / | / | / |
| P4R1 | 2 | 0.105 | 0.575 | / | / |
| P4R2 | 2 | 1.105 | 1.315 | / | / |
| P5R1 | 3 | 0.495 | 1.375 | 1.935 | / |
| P5R2 | 1 | 0.585 | / | / | / |

TABLE 12

| | Number of arrest points | Arrest point position 1 | Arrest point position 2 | Arrest point position 3 |
|---|---|---|---|---|
| P1R1 | 0 | / | / | / |
| P1R2 | 0 | / | / | / |
| P2R1 | 1 | 0.055 | / | / |
| P2R2 | 0 | / | / | / |
| P3R1 | 0 | / | / | / |
| P3R2 | 1 | 0.875 | / | / |
| P4R1 | 2 | 0.175 | 0.815 | / |
| P4R2 | 0 | / | / | / |
| P5R1 | 3 | 0.915 | 1.815 | 1.985 |
| P5R2 | 1 | 1.735 | / | / |

Figure 10:
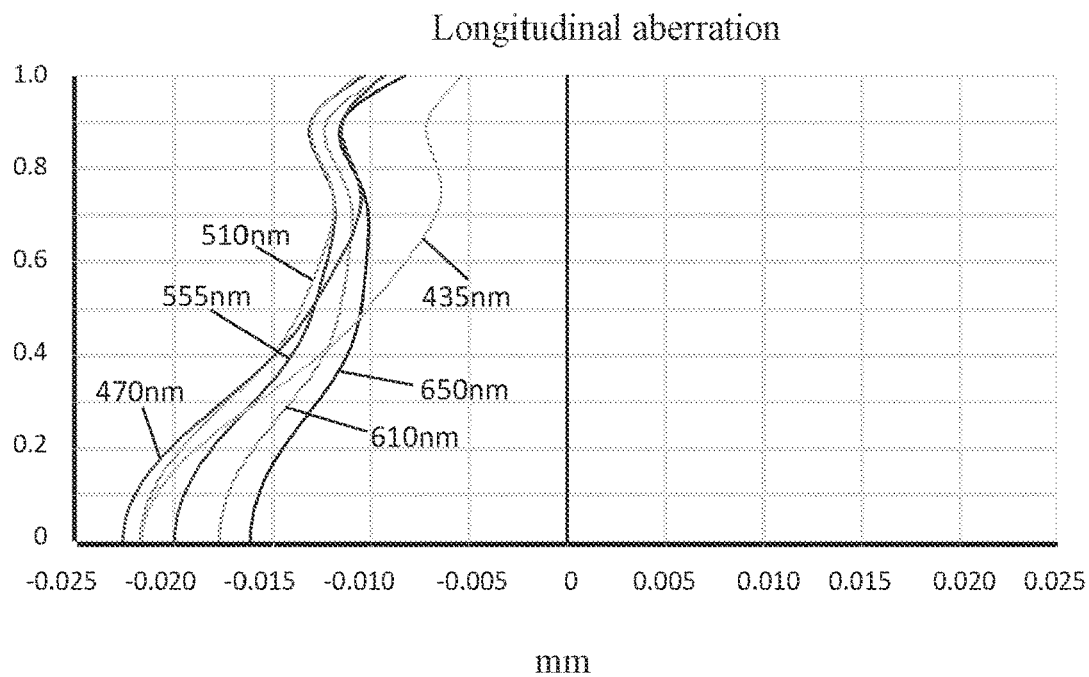
FIG. 10 is a schematic diagram of a longitudinal aberration of the camera optical lens shown in FIG. 9.
Figure 11:
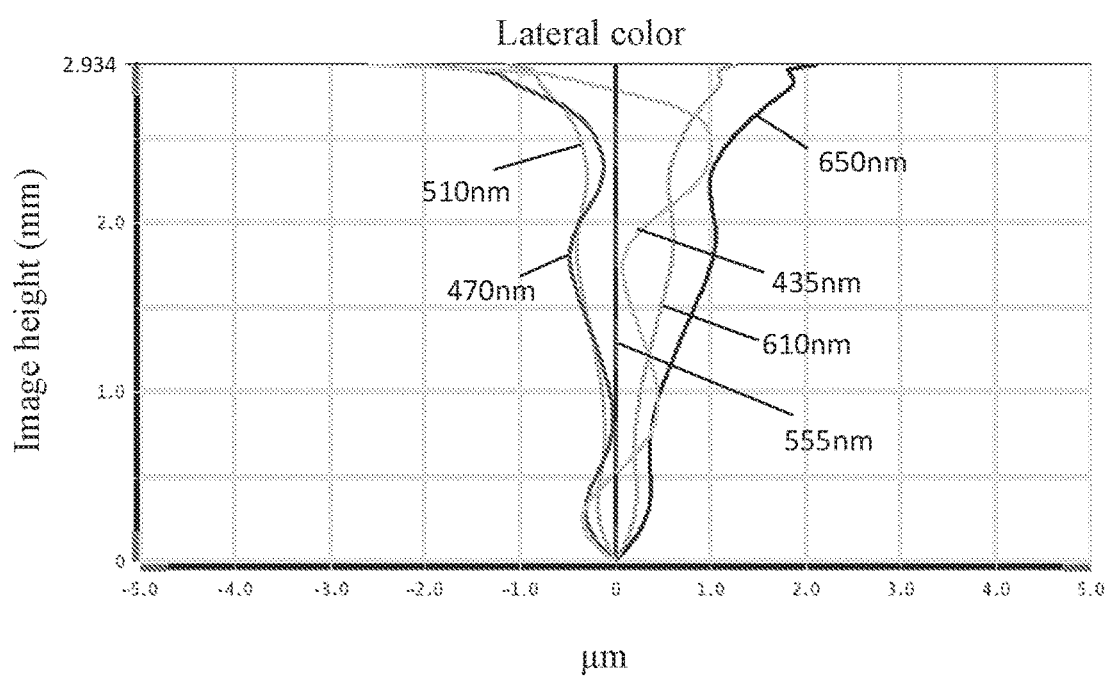
FIG. 11 is a schematic diagram of a lateral color of the camera optical lens shown in FIG. 9.
Figure 12:
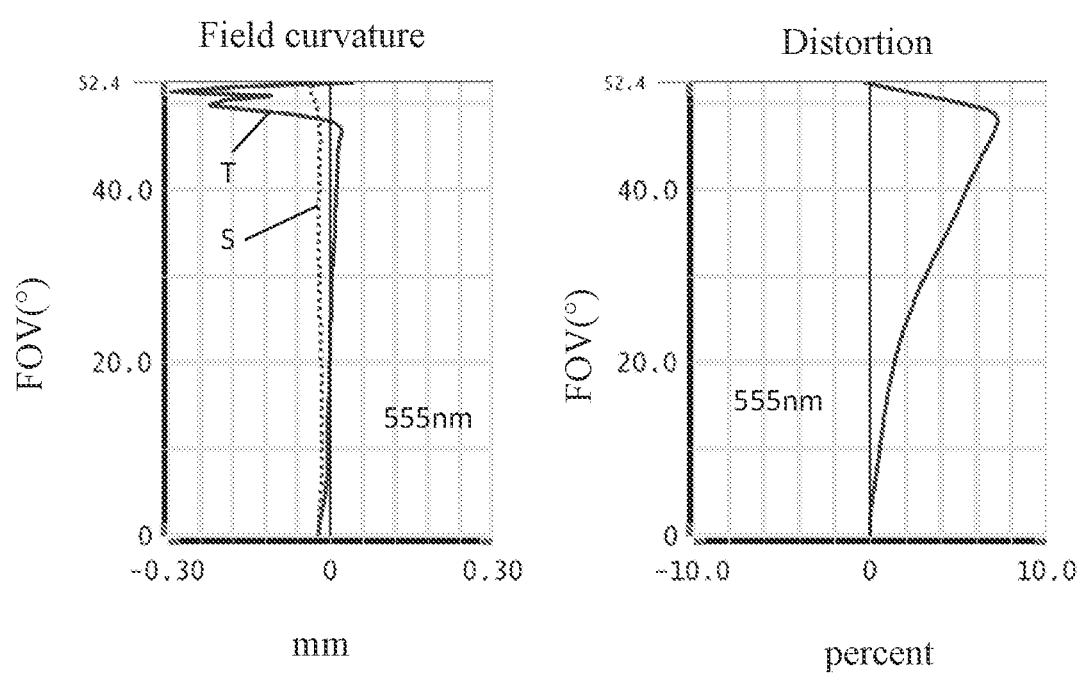
FIG. 12 is a schematic diagram of a field curvature and a distortion of the camera optical lens shown in FIG. 9.

FIG. 10 and FIG. 11 respectively illustrate a longitudinal aberration and a lateral color of light with wavelengths of 650 nm, 610 nm, 555 nm, 510 nm, 470 nm and 435 nm after passing the camera optical lens 30 according to Embodiment 3. FIG. 12 illustrates a field curvature and a distortion of light with a wavelength of 555 nm after passing the camera optical lens 30 according to Embodiment 3, in which a field curvature S is a field curvature in a sagittal direction and T is a field curvature in a tangential direction.

Table 21 in the following lists values corresponding to the respective conditions. In the present Embodiment 3 in order to satisfy the above conditions.

In the present embodiment, an entrance pupil diameter (ENPD) of the camera optical lens is 0.980 mm. An image height of 1.0H is 2.934 mm. An FOV is 104.80°. Thus, the camera optical lens 30 satisfies design requirements of large aperture, ultra-thin and wide-angle while the on-axis and off-axis aberrations are sufficiently corrected, thereby achieving excellent optical characteristics.

Embodiment 4

Embodiment 4 is basically the same as Embodiment 1 and involves symbols having the same meanings as Embodiment 1, and only differences therebetween will be described in the following.

Figure 13:
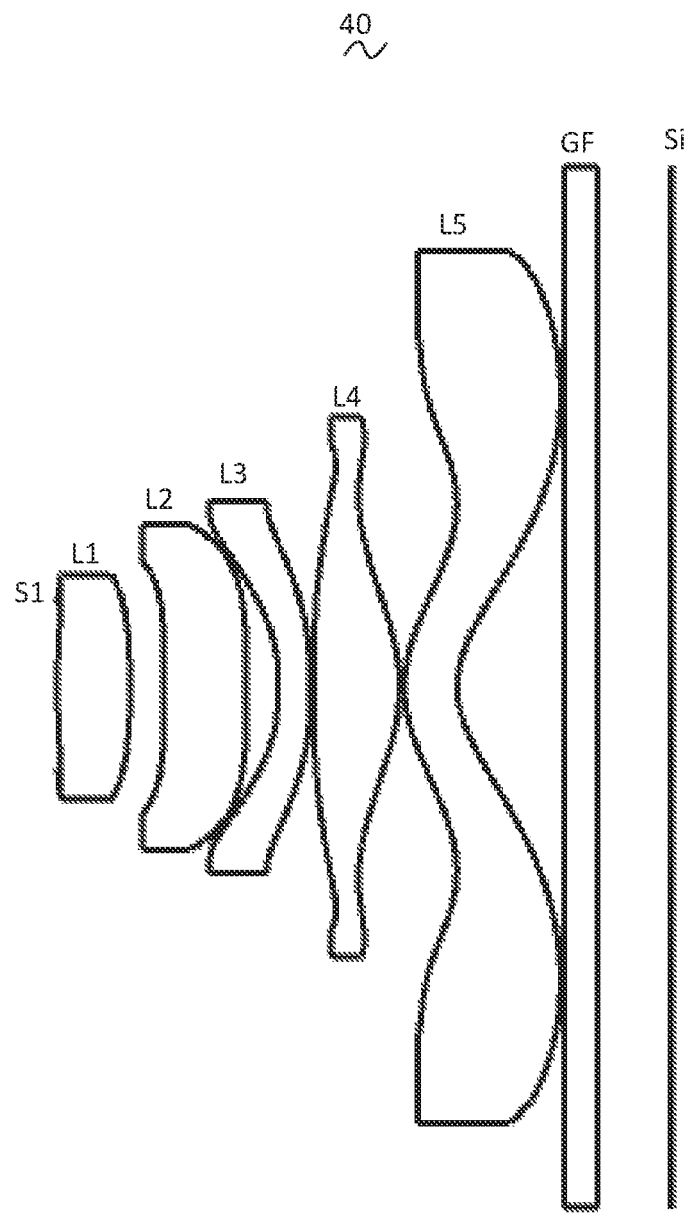
FIG. 13 is a schematic diagram of a structure of a camera optical lens in accordance with Embodiment 4 of the present invention.

FIG. 13 shows a schematic diagram of a structure of a camera optical lens 40 according to Embodiment 4 of the present invention. A second lens L2 has a negative refractive power. The second lens L2 has an object side surface being concave in a paraxial region, and an image side surface being concave in the paraxial region. Tables 13 and 14 show design data of a camera optical lens 40 in Embodiment 4 of the present invention.

TABLE 13

| | R | d | | nd | | vd | |
|---|---|---|---|---|---|---|---|
| S1 | ∞ | d0= | −0.006 | | | | |
| R1 | 3.907 | d1= | 0.457 | nd1 | 1.5444 | v1 | 55.95 |
| R2 | −4.711 | d2= | 0.215 | | | | |
| R3 | −1273.571 | d3= | 0.519 | nd2 | 1.5444 | v2 | 55.95 |
| R4 | 2839.786 | d4= | 0.201 | | | | |
| R5 | −1.538 | d5= | 0.200 | nd3 | 1.6700 | v3 | 19.24 |
| R6 | −4.183 | d6= | 0.030 | | | | |
| R7 | −7.328 | d7= | 0.533 | nd4 | 1.5444 | v4 | 55.95 |
| R8 | −0.959 | d8= | 0.030 | | | | |
| R9 | 0.674 | d9= | 0.333 | nd5 | 1.5346 | v5 | 56.12 |
| R10 | 0.483 | d10= | 0.672 | | | | |
| R11 | ∞ | d11= | 0.210 | ndg | 1.5168 | vg | 64.17 |
| R12 | ∞ | d12= | 0.474 | | | | |

Table 14 shows aspherical surface data of each lens of the camera optical lens 40 in Embodiment 4 of the present invention.

TABLE 14

| | Conic coefficient | Aspheric surface coefficients | | | | |
|---|---|---|---|---|---|---|
| | k | A4 | A6 | A8 | A10 | A12 |
| R1 | −7.9625E+01 | −1.0060E−03 | 1.1082E+00 | −3.6556E+01 | 4.8754E+02 | −3.9612E+03 |
| R2 | 4.4980E+01 | −2.8345E−01 | 2.5183E−01 | −3.2766E+00 | 2.3274E+01 | −9.6548E+01 |
| R3 | −9.9000E+01 | −4.3765E−01 | 1.3179E+00 | −1.3792E+01 | 8.5526E+01 | −3.5176E+02 |
| R4 | 1.9996E+02 | −6.2346E−01 | 1.4516E+00 | −3.2317E+00 | 2.2713E+00 | 5.1019E+00 |
| R5 | 1.1326E+00 | −1.6113E+00 | 5.2215E+00 | −3.4673E+00 | −2.4846E+01 | 9.4669E+01 |
| R6 | −5.9456E+01 | −1.3134E+00 | 4.9309E+00 | −1.3118E+01 | 2.4192E+01 | −3.0133E+01 |
| R7 | −1.2657E+00 | 6.3862E−01 | −1.3996E+00 | 2.0283E+00 | −2.0413E+00 | 1.4073E+00 |
| R8 | −2.3208E+00 | 1.9297E−01 | 5.6643E−03 | 4.2551E−01 | −4.0900E−01 | 6.4562E−01 |
| R9 | −2.2693E+00 | −2.2769E−01 | 1.2687E−01 | −1.5524E−01 | 1.2006E−01 | −5.3544E−02 |
| R10 | −2.1980E+00 | −1.2752E−01 | 6.1817E−03 | 2.9006E−02 | −1.8977E−02 | 6.3799E−03 |

| | Conic coefficient | Aspheric surface coefficients | | | |
|---|---|---|---|---|---|
| | k | A14 | A16 | A18 | A20 |
| R1 | −7.9625E+01 | 2.0228E+04 | −6.3492E+04 | 1.1208E+05 | −8.5312E+04 |
| R2 | 4.4980E+01 | 2.2723E+02 | −2.3729E+02 | −3.6466E+01 | 2.0261E+02 |
| R3 | −9.9000E+01 | 9.3973E+02 | −1.5521E+03 | 1.4324E+03 | −5.7170E+02 |
| R4 | 1.9996E+02 | −1.4562E+01 | 1.3988E+00 | −5.2393E+00 | 3.5882E−01 |
| R5 | 1.1326E+00 | −1.6638E+02 | 1.6395E+02 | −8.6428E+01 | 1.8956E+01 |
| R6 | −5.9456E+01 | 2.4657E+01 | −1.2497E+01 | 3.4950E+00 | −3.9958E−01 |
| R7 | −1.2657E+00 | −6.3151E−01 | 1.6892E−01 | −2.2724E−02 | 8.8527E−04 |
| R8 | −2.3208E+00 | −4.6784E−01 | 1.7823E−01 | −3.4792E−02 | 2.7542E−03 |
| R9 | −2.2693E+00 | 1.5401E−02 | −2.8884E−03 | 3.1900E−04 | −1.5496E−05 |
| R10 | −2.1980E+00 | −1.2990E−03 | 1.6002E−04 | −1.0901E−05 | 3.1167E−07 |

Table 15 and table 16 show Embodiment 4 design data of inflexion points and arrest points of respective lens in the camera optical lens 40 according to Embodiment 4 of the present invention.

TABLE 15

| | Number of inflexion points | Inflexion point position 1 | Inflexion point position 2 | Inflexion point position 3 | Inflexion point position 4 |
|---|---|---|---|---|---|
| P1R1 | 1 | 0.345 | / | / | / |
| P1R2 | 0 | / | / | / | / |
| P2R1 | 0 | / | / | / | / |
| P2R2 | 1 | 0.015 | / | / | / |
| P3R1 | 1 | 0.795 | / | / | / |
| P3R2 | 1 | 0.815 | / | / | / |
| P4R1 | 2 | 0.145 | 1.115 | / | / |
| P4R2 | 2 | 0.545 | 1.305 | / | / |
| P5R1 | 3 | 0.545 | 1.465 | 1.925 | / |
| P5R2 | 1 | 0.585 | / | / | / |

TABLE 16

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 1 | 0.015 | / |
| P3R1 | 0 | / | / |
| P3R2 | 1 | 1.055 | / |
| P4R1 | 2 | 0.255 | 1.305 |
| P4R2 | 2 | 1.115 | 1.465 |
| P5R1 | 1 | 1.065 | / |
| P5R2 | 1 | 1.705 | / |

Figure 14:
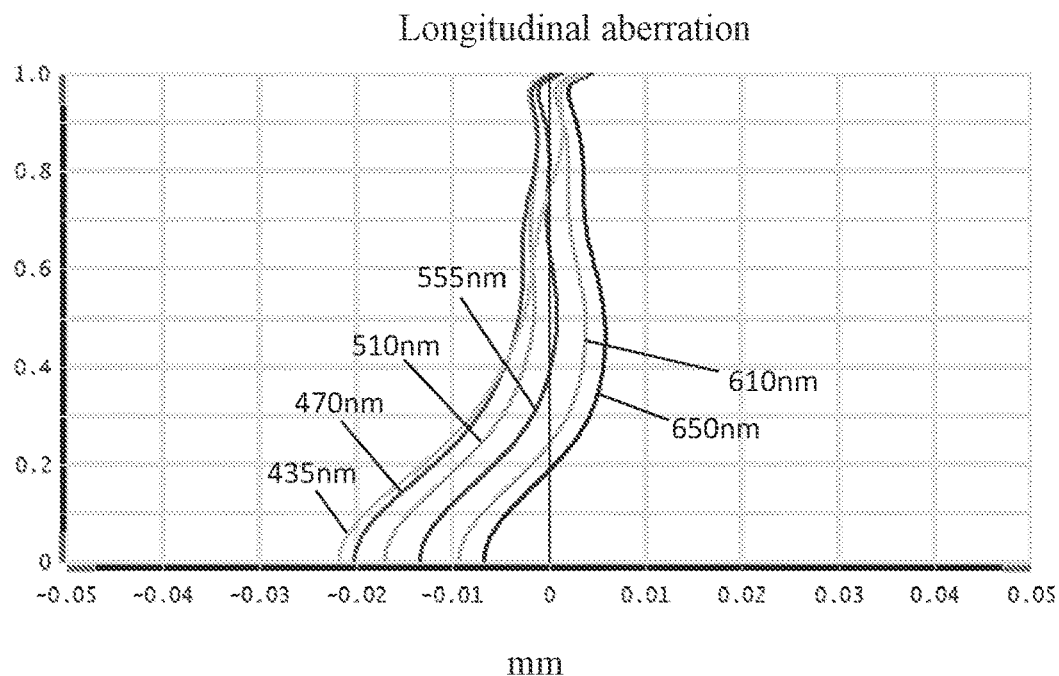
FIG. 14 is a schematic diagram of a longitudinal aberration of the camera optical lens shown in FIG. 13.
Figure 15:
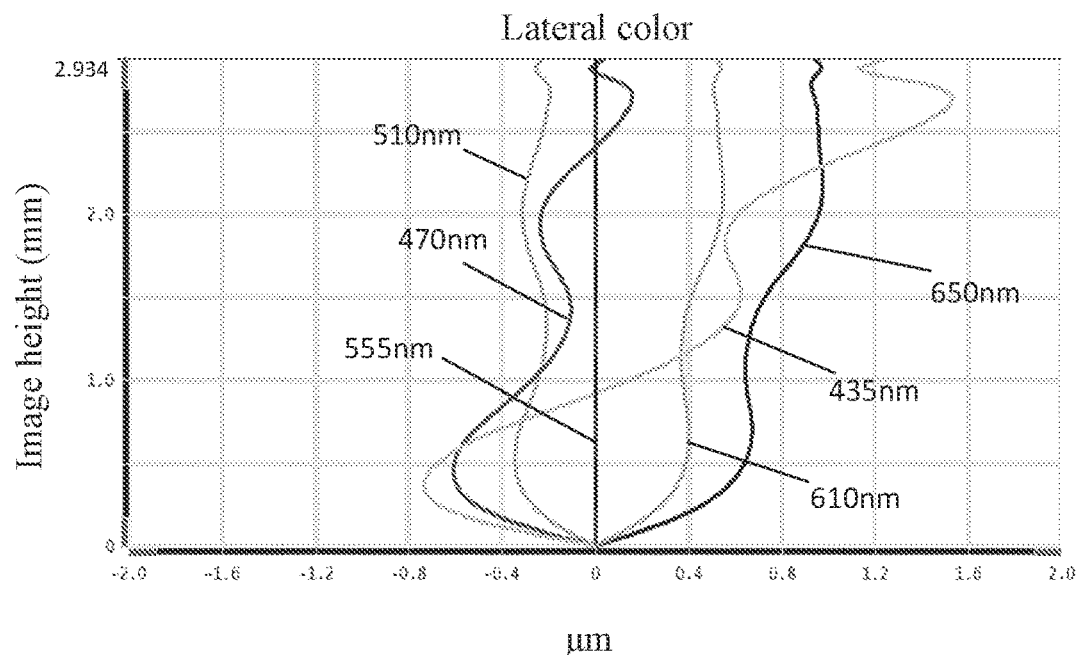
FIG. 15 is a schematic diagram of a lateral color of the camera optical lens shown in FIG. 13.
Figure 16:
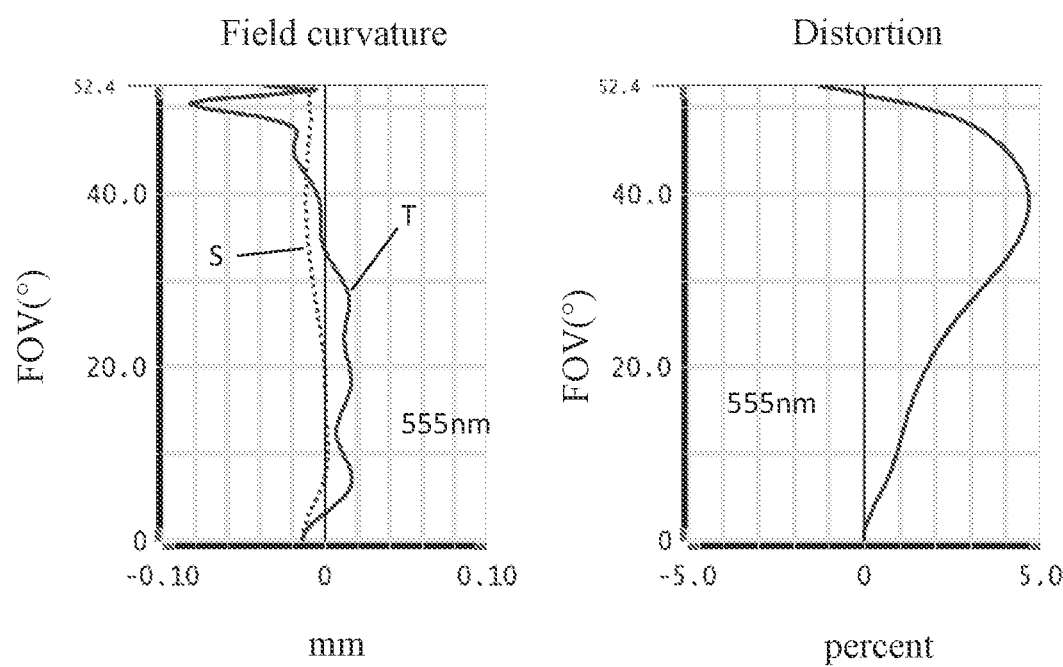
FIG. 16 is a schematic diagram of a field curvature and a distortion of the camera optical lens shown in FIG. 13.

FIG. 14 and FIG. 15 respectively illustrate a longitudinal aberration and a lateral color of light with wavelengths of 650 nm, 610 nm, 555 nm, 510 nm, 470 nm and 435 nm after passing the camera optical lens 30 according to Embodiment 4. FIG. 16 illustrates a field curvature and a distortion of light with a wavelength of 555 nm after passing the camera optical lens 40 according to Embodiment 4, in which a field curvature S is a field curvature in a sagittal direction and T is a field curvature in a tangential direction.

Table 21 in the following lists values corresponding to the respective conditions. In the present Embodiment 4 in order to satisfy the above conditions.

In the present embodiment, an entrance pupil diameter (ENPD) of the camera optical lens is 1.003 mm. An image height of 1.0H is 2.934 mm. An FOV is 104.80°. Thus, the camera optical lens 40 satisfies design requirements of large aperture, ultra-thin and wide-angle while the on-axis and off-axis aberrations are sufficiently corrected, thereby achieving excellent optical characteristics.

Comparative Embodiment

Comparative Embodiment is basically the same as Embodiment 1 and involves symbols having the same meanings as Embodiment 1, and only differences therebetween will be described in the following.

Figure 17:
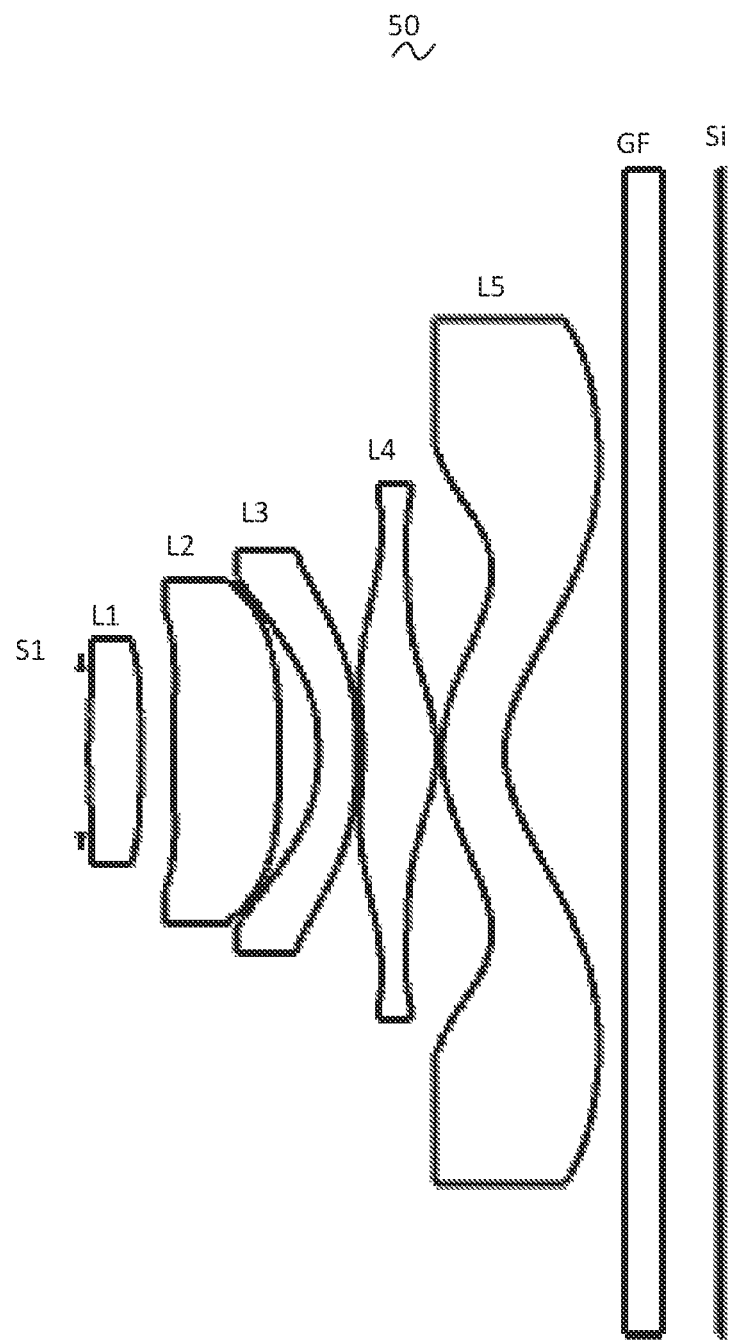
FIG. 17 is a schematic diagram of a structure of a camera optical lens in accordance with Comparative Embodiment.

FIG. 17 shows a schematic diagram of a structure of a camera optical lens 50 according to Comparative Embodiment. Tables 17 and 18 show design data of a camera optical lens 50 in Comparative Embodiment.

TABLE 17

| | R | | d | nd | | vd | |
|---|---|---|---|---|---|---|---|
| S1 | ∞ | d0= | 0.052 | | | | |
| R1 | 3.509 | d1= | 0.288 | nd1 | 1.5444 | v1 | 55.95 |
| R2 | −117.608 | d2= | 0.192 | | | | |
| R3 | 5.461 | d3= | 0.619 | nd2 | 1.5444 | v2 | 55.95 |
| R4 | −5.461 | d4= | 0.207 | | | | |
| R5 | −1.452 | d5= | 0.207 | nd3 | 1.6700 | v3 | 19.24 |
| R6 | −3.954 | d6= | 0.032 | | | | |

TABLE 17-continued

| | R | d | | nd | | vd | |
|---|---|---|---|---|---|---|---|
| R7 | −1.850 | d7= | 0.372 | nd4 | 1.5444 | v4 | 55.95 |
| R8 | −0.727 | d8= | 0.030 | | | | |
| R9 | 1.004 | d9= | 0.358 | nd5 | 1.5346 | v5 | 56.12 |
| R10 | 0.785 | d10= | 0.672 | | | | |
| R11 | ∞ | d11= | 0.210 | ndg | 1.5168 | vg | 64.17 |
| R12 | ∞ | d12= | 0.371 | | | | |

Table 18 shows aspherical surface data of each lens of the camera optical lens 50 in Comparative Embodiment.

TABLE 18

| | Conic coefficient | Aspheric surface coefficients | | | | |
|---|---|---|---|---|---|---|
| | k | A4 | A6 | A8 | A10 | A12 |
| R1 | −9.6840E+01 | 1.7209E−01 | −5.0767E+00 | 9.4671E+01 | −1.3097E+03 | 1.1576E+04 |
| R2 | −9.8955E+01 | −4.5398E−01 | 1.3984E+00 | −2.2145E+01 | 1.7222E+02 | −8.0504E+02 |
| R3 | 4.9542E+01 | −1.5644E−01 | −2.6326E+00 | 2.2017E+01 | −1.2942E+02 | 4.8246E+02 |
| R4 | −1.3448E+02 | −7.0624E−01 | 3.5718E+00 | −1.7957E+01 | 5.9222E+01 | −1.3814E+02 |
| R5 | 1.1783E+00 | −2.0929E+00 | 5.0860E+00 | 1.5373E+01 | −1.2940E+02 | 3.7992E+02 |
| R6 | 2.9529E+01 | −1.0858E+00 | 1.9601E+00 | 1.3302E+00 | −1.7500E+01 | 4.6486E+01 |
| R7 | −2.9911E+01 | 1.2511E+00 | −3.3674E+00 | 6.8641E+00 | −1.0739E+01 | 1.1628E+01 |
| R8 | −6.7737E+00 | −3.0637E−02 | 1.8028E+00 | −3.9140E+00 | 3.5751E+00 | −1.3800E+00 |
| R9 | −2.4868E+00 | 6.7273E−01 | −2.3165E+00 | 3.9773E+00 | −4.5879E+00 | 3.2614E+00 |
| R10 | −2.2120E+00 | 3.7014E−01 | −9.0619E−01 | 8.5166E−01 | −4.7556E−01 | 1.7126E−01 |

| | Conic coefficient | Aspheric surface coefficients | | | |
|---|---|---|---|---|---|
| | k | A14 | A16 | A18 | A20 |
| R1 | −9.6840E+01 | −6.4681E+04 | 2.2118E+05 | −4.2177E+05 | 3.4262E+05 |
| R2 | −9.8955E+01 | 2.2208E+03 | −3.2575E+03 | 1.8373E+03 | 2.5674E+02 |
| R3 | 4.9542E+01 | −1.1627E+03 | 1.7805E+03 | −1.5810E+03 | 6.1747E+02 |
| R4 | −1.3448E+02 | 2.1793E+02 | −2.1404E+02 | 1.1533E+02 | −2.5566E+01 |
| R5 | 1.1783E+00 | −6.1448E+02 | 5.7760E+02 | −2.9640E+02 | 6.4586E+01 |
| R6 | 2.9529E+01 | −6.4133E+01 | 4.9549E+01 | −2.0195E+01 | 3.3754E+00 |
| R7 | −2.9911E+01 | −8.1840E+00 | 3.5429E+00 | −8.5234E−01 | 8.6509E−02 |
| R8 | −6.7737E+00 | −3.0612E−02 | 2.0445E−01 | −6.2800E−02 | 6.2356E−03 |
| R9 | −2.4868E+00 | −1.3873E+00 | 3.4427E−01 | −4.5967E−02 | 2.5520E−03 |
| R10 | −2.2120E+00 | −4.0115E−02 | 5.9021E−03 | −4.9517E−04 | 1.8047E−05 |

Table 19 and table 20 show Comparative Embodiment design data of inflexion points and arrest points of respective lens in the camera optical lens 50 according to Comparative Embodiment.

TABLE 19

| | Number of inflexion points | Inflexion point position 1 | Inflexion point position 2 | Inflexion point position 3 | Inflexion point position 4 |
|---|---|---|---|---|---|
| P1R1 | 1 | 0.315 | / | / | / |
| P1R2 | 0 | / | / | / | / |
| P2R1 | 1 | 0.235 | / | / | / |
| P2R2 | 0 | / | / | / | / |
| P3R1 | 1 | 0.795 | / | / | / |
| P3R2 | 1 | 0.895 | / | / | / |
| P4R1 | 2 | 0.185 | 0.775 | / | / |
| P4R2 | 2 | 0.345 | 1.265 | / | / |
| P5R1 | 2 | 0.605 | 1.275 | / | / |
| P5R2 | 1 | 0.665 | / | / | / |

TABLE 20

| | Number of arrest points | Arrest point position 1 | Arrest point position 2 |
|---|---|---|---|
| P1R1 | 0 | / | / |
| P1R2 | 0 | / | / |
| P2R1 | 1 | 0.675 | / |
| P2R2 | 0 | / | / |
| P3R1 | 1 | 0.205 | / |
| P3R2 | 1 | 0.155 | / |
| P4R1 | 1 | 0.935 | / |

TABLE 20-continued

| | Number of arrest points | Arrest point position 1 | Arrest point position 2 |
|---|---|---|---|
| P4R2 | 0 | / | / |
| P5R1 | 1 | 0.955 | / |
| P5R2 | 1 | 1.185 | / |

Figure 18:
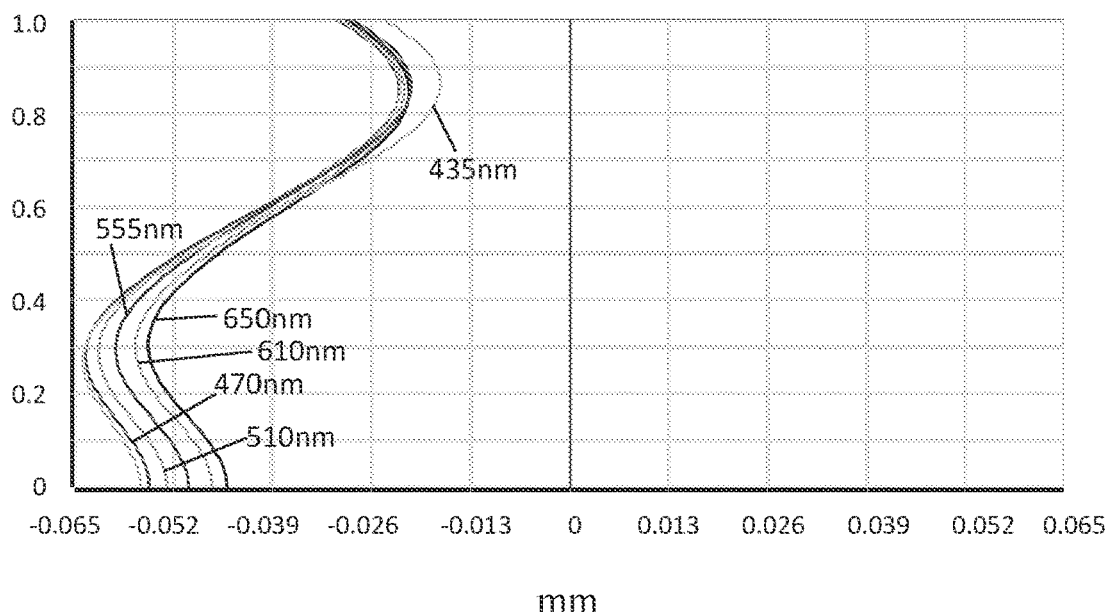
FIG. 18 is a schematic diagram of a longitudinal aberration of the camera optical lens shown in FIG. 17.
Figure 19:
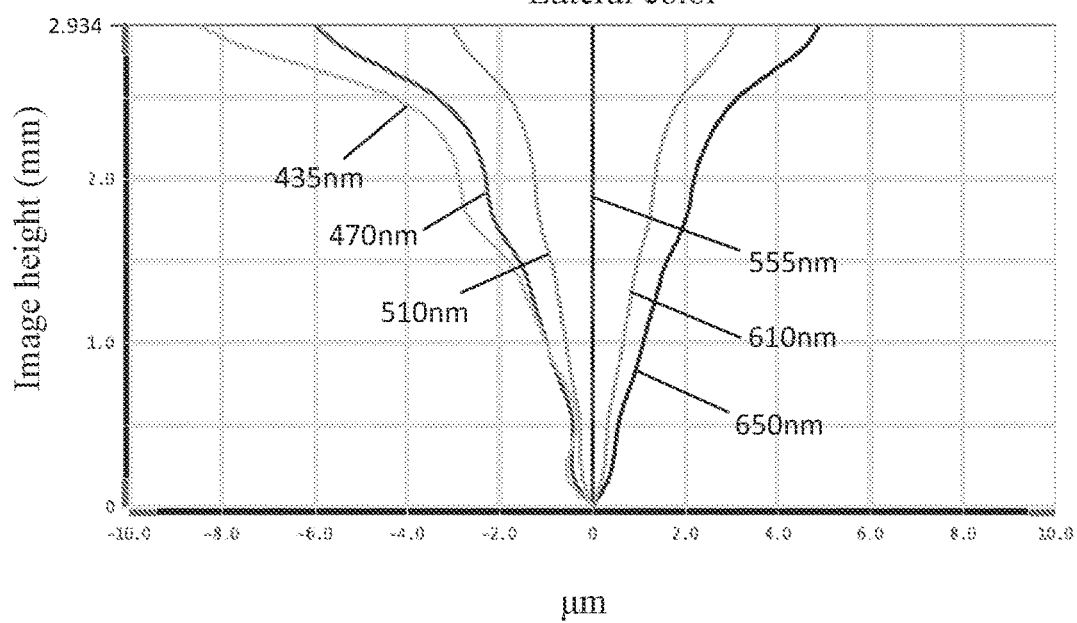
FIG. 19 is a schematic diagram of a lateral color of the camera optical lens shown in FIG. 17.
Figure 20:
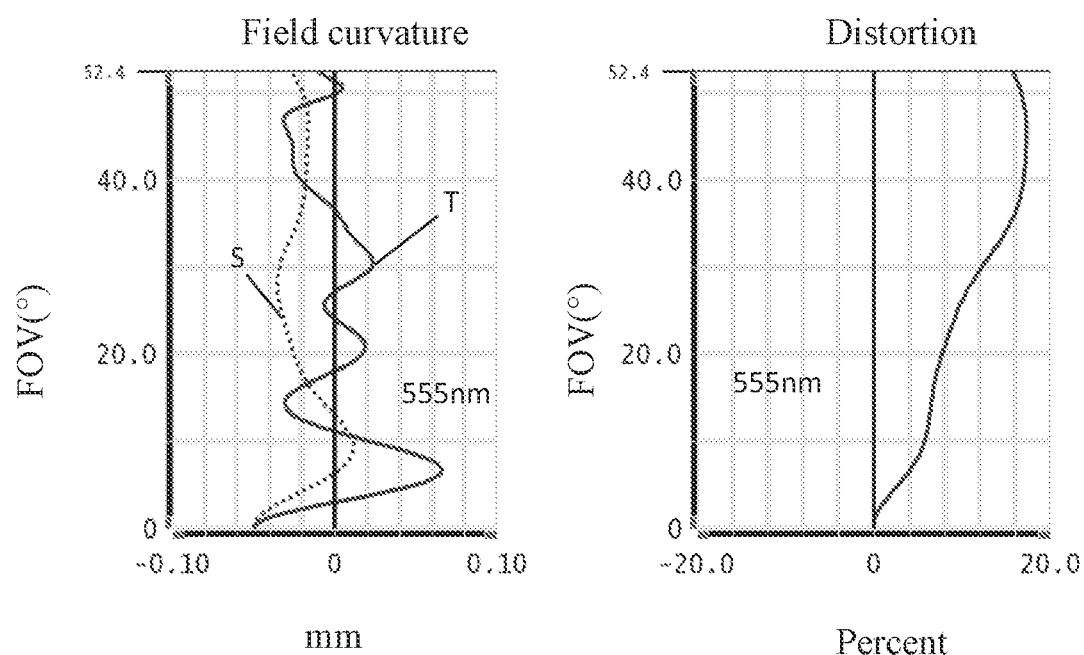
FIG. 20 is a schematic diagram of a field curvature and a distortion of the camera optical lens shown in FIG. 17.

FIG. 18 and FIG. 19 respectively illustrate a longitudinal aberration and a lateral color of light with wavelengths of 650 nm, 610 nm, 555 nm, 510 nm, 470 nm and 435 nm after passing the camera optical lens 50 according to Comparative Embodiment. FIG. 20 illustrates a field curvature and a distortion of light with a wavelength of 555 nm after passing the camera optical lens 50 according to Comparative Embodiment, in which a field curvature S is a field curvature in a sagittal direction and T is a field curvature in a tangential direction.

Table 21 in the following lists values corresponding to the respective conditions. Comparative Embodiment does not satisfy the above conditions $1.20 \leq f1/f \leq 3.00$.

In the present embodiment, an entrance pupil diameter (ENPD) of the camera optical lens is 0.858 mm. An image height of 1.0H is 2.934 mm. An FOV is 104.80°. Thus, the camera optical lens 50 does not satisfy design requirements of large aperture, ultra-thin and wide-angle.

TABLE 21

| Parameters and conditions | Embodiment 1 | Embodiment 2 | Embodiment 3 | Embodiment 4 | Comparative Embodiment |
|---|---|---|---|---|---|
| f1/f | 1.816 | 2.980 | 1.320 | 1.736 | 3.179 |
| f5/f | −3.362 | −7.277 | −2.375 | −3.541 | −7.999 |
| d5/d6 | 7.667 | 9.938 | 3.219 | 6.667 | 6.469 |
| (R3+R4)/(R3 − R4) | −0.080 | 0.000 | −0.960 | −0.381 | 0.000 |
| f | 2.488 | 2.440 | 2.242 | 2.295 | 1.964 |
| f1 | 4.518 | 7.270 | 2.960 | 3.985 | 6.243 |
| f2 | 10.359 | 4.815 | 202.445 | −1609.760 | 5.102 |
| f3 | −4.273 | −3.750 | −3.206 | −3.710 | −3.510 |
| f4 | 2.824 | 2.992 | 2.009 | 1.961 | 1.965 |
| f5 | −8.364 | −17.756 | −5.324 | −8.126 | −15.710 |
| f12 | 3.268 | 3.056 | 2.923 | 3.994 | 2.958 |
| FNO | 2.289 | 2.289 | 2.288 | 2.288 | 2.289 |
| TTL | 3.970 | 4.113 | 3.696 | 3.874 | 3.558 |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens comprising, from an object side to an image side in sequence: a first lens having a positive refractive power, a second lens having a refractive power, a third lens having a negative refractive power, a fourth lens having a positive refractive power, and a fifth lens having a negative refractive power; wherein the camera optical lens satisfies the following conditions:

$1.20 \leq f1/f \leq 3.00$;
$-8.00 \leq f5/f \leq -2.00$;
$3.00 \leq d5/d6 \leq 10.00$;
$-1.00 \leq (R3+R4)/(R3-R4) \leq 0$; and
$2.00 \leq R7/R8 \leq 15.00$;
where,
f: a focal length of the camera optical lens;
f1: a focal length of the first lens;
R3: a central curvature radius of an object side surface of the second lens;
R4: a central curvature radius of an image side surface of the second lens;
d5: an on-axis thickness of the third lens;
d6: an on-axis distance from an image side surface of the third lens to an object side surface of the fourth lens;
f5: a focal length of the fifth lens;
R7: a central curvature radius of the object side surface of the fourth lens; and
R8: a central curvature radius of an image side surface of the fourth lens.

2. The camera optical lens according to claim 1, wherein the first lens has an object side surface being convex in a paraxial region and an image side surface being convex in the paraxial region; the camera optical lens further satisfies the following conditions:

$-1.96 \leq (R1+R2)/(R1-R2) \leq -0.06$; and
$0.04 \leq d1/TTL \leq 0.22$;
where,
R1: a central curvature radius of the object side surface of the first lens;
R2: a central curvature radius of the image side surface of the first lens;
d1: an on-axis thickness of the first lens; and
TTL: a total optical length from the object side surface of the first lens of the camera optical lens to an image surface of the camera optical lens along an optical axis.

3. The camera optical lens according to claim 1 further satisfying the following conditions:

$f2/f \leq 135.44$; and
$0.05 \leq d3/TTL \leq 0.24$;
where,
f2: a focal length of the second lens;
d3: an on-axis thickness of the second lens; and
TTL: a total optical length from an object side surface of the first lens of the camera optical lens to an image surface of the camera optical lens along an optical axis.

4. The camera optical lens according to claim 1, wherein the third lens has an object side surface being concave in a paraxial region and the image side surface of the third lens is convex in the paraxial region; the camera optical lens further satisfies the following conditions:

$-3.43 \leq f3/f \leq -0.95$;
$-5.46 \leq (R5+R6)/(R5-R6) \leq -1.09$; and
$0.03 \leq d5/TTL \leq 0.12$,
where,
f3: a focal length of the third lens;
R5: a central curvature radius of the object side surface of the third lens;
R6: a central curvature radius of the image side surface of the third lens; and
TTL: a total optical length from an object side surface of the first lens of the camera optical lens to an image surface of the camera optical lens along an optical axis.

5. The camera optical lens according to claim 1, wherein the object side surface of the fourth lens is concave in a paraxial region and the image side surface of the fourth lens is convex in the paraxial region; the camera optical lens further satisfies the following conditions:

$0.43 \leq f4/f \leq 1.84$;
$0.57 \leq (R7+R8)/(R7-R8) \leq 4.44$; and
$0.06 \leq d7/TTL \leq 0.27$;
where,
f4: a focal length of the fourth lens;
d7: an on-axis thickness of the fourth lens; and
TTL: a total optical length from an object side surface of the first lens of the camera optical lens to an image surface of the camera optical lens along an optical axis.

6. The camera optical lens according to claim 1, wherein the fifth lens has an object side surface being convex in a paraxial region and an image side surface being concave in the paraxial region; the camera optical lens further satisfies the following conditions:

2.14≤(R9+R10)/(R9−R10)≤9.13; and 0.04≤d9/TTL≤0.25;

where,

R9: a central curvature radius of the object side surface of the fifth lens;

R10: a central curvature radius of the image side surface of the fifth lens;

d9: an on-axis thickness of the fifth lens; and

TTL: a total optical length from an object side surface of the first lens of the camera optical lens to an image surface of the camera optical lens along an optical axis.

7. The camera optical lens according to claim 1 further satisfying the following condition: 0.63≤f12/f≤2.61;

where, f12: a combined focal length of the first lens and the second lens.

8. The camera optical lens according to claim 1 further satisfying the following condition: FOV≥102.7°;

where,

FOV: a field of view of the camera optical lens in a diagonal direction.

9. The camera optical lens according to claim 1 further satisfying following condition: TTL/IH≤1.47;

where,

IH: an image height of the camera optical lens; and

TTL: a total optical length from an object side surface of the first lens of the camera optical lens to an image surface of the camera optical lens along an optical axis.

* * * * *